Jan. 28, 1947.  J. H. BORDEN  2,414,924
ELECTRICAL SYSTEM AND APPARATUS FOR POSITIONING
GUNS AND OTHER MOVABLE OBJECTS
Filed Nov. 16, 1944  11 Sheets-Sheet 2
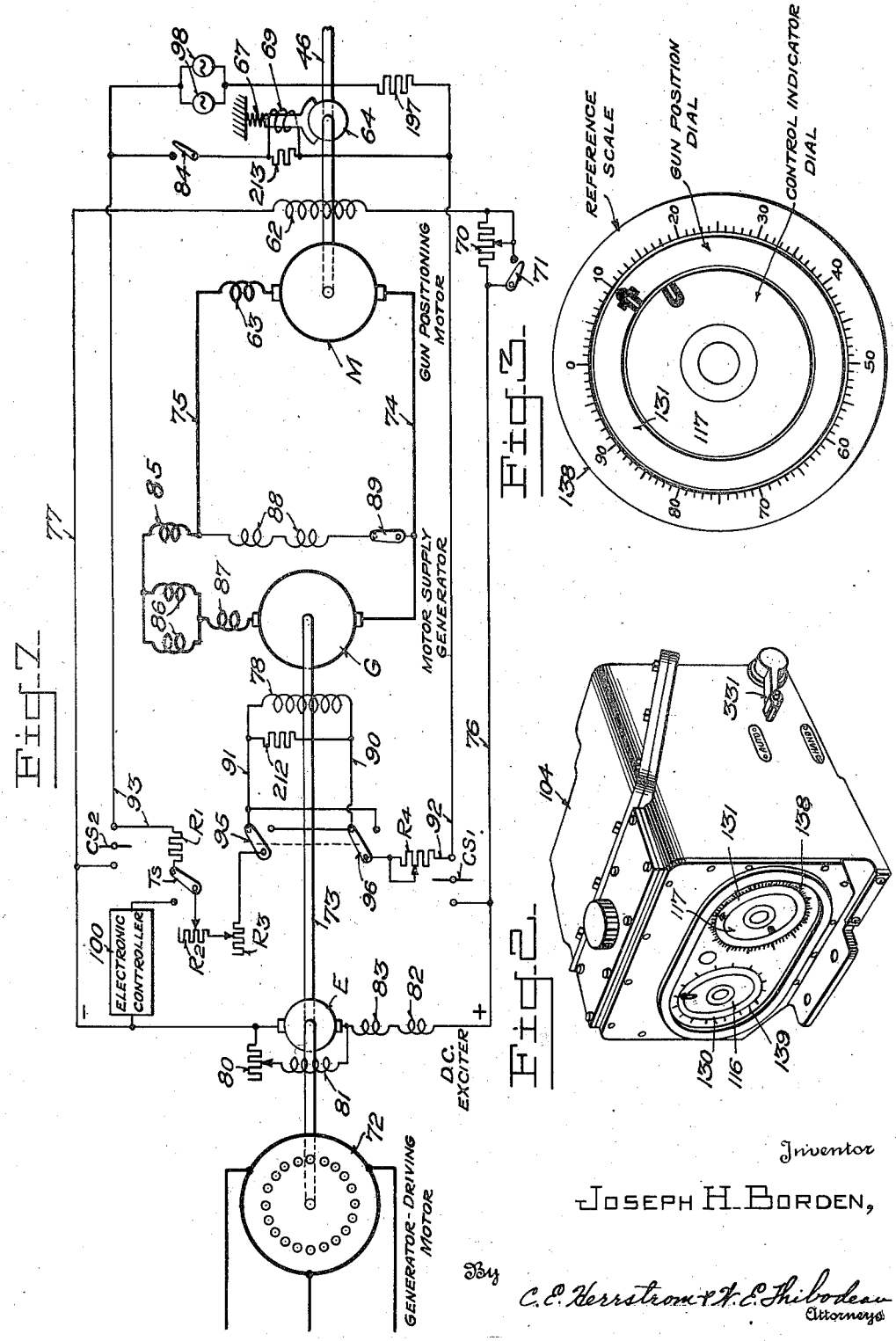
Inventor
JOSEPH H. BORDEN,
By C. E. Herrstrom & W. E. Thibodeau
Attorneys

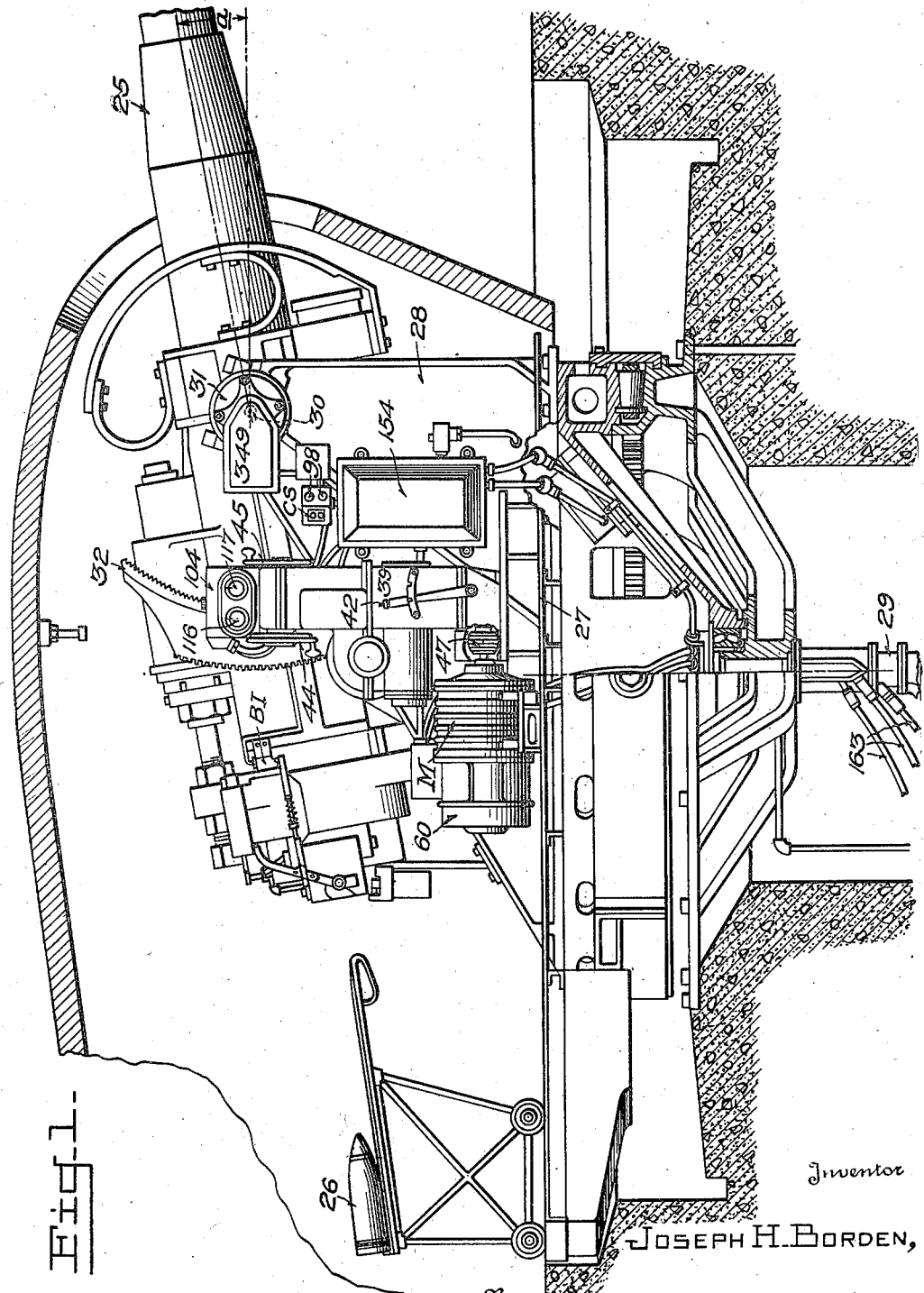

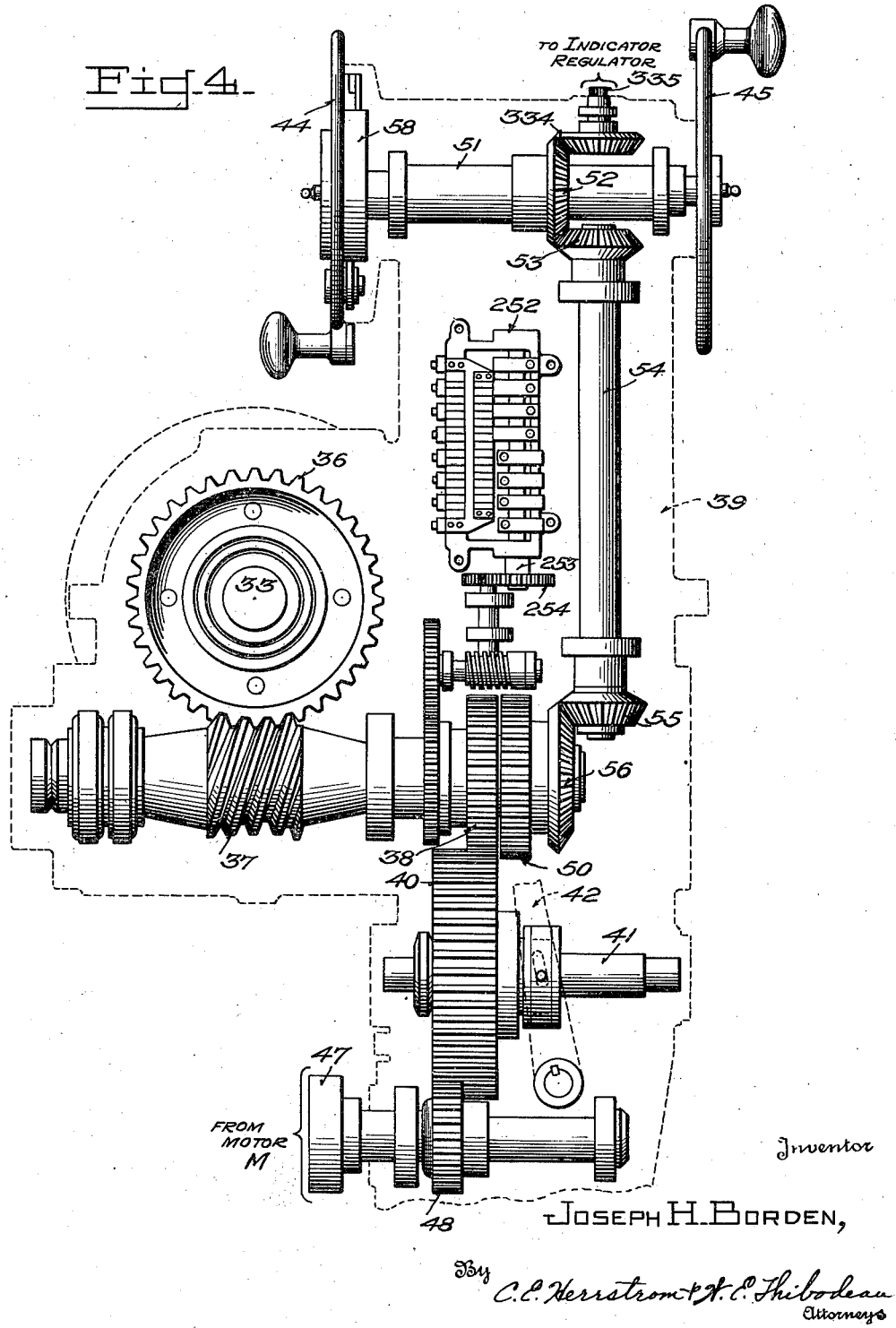

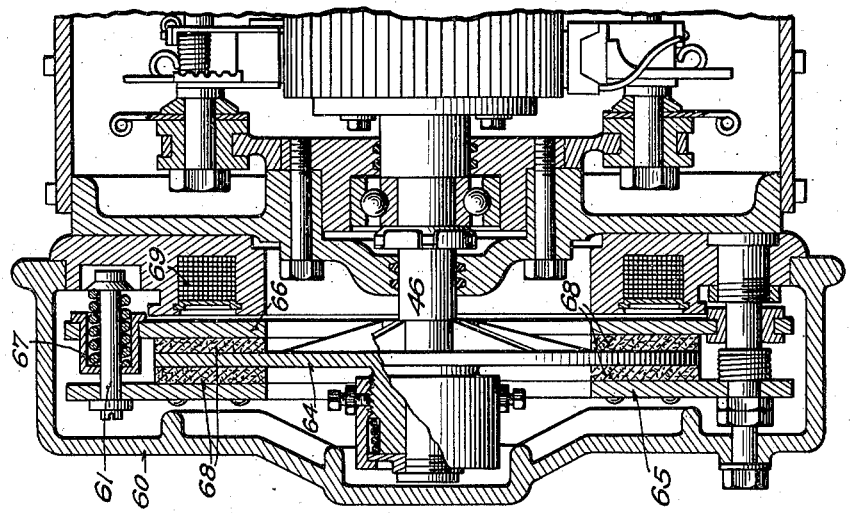
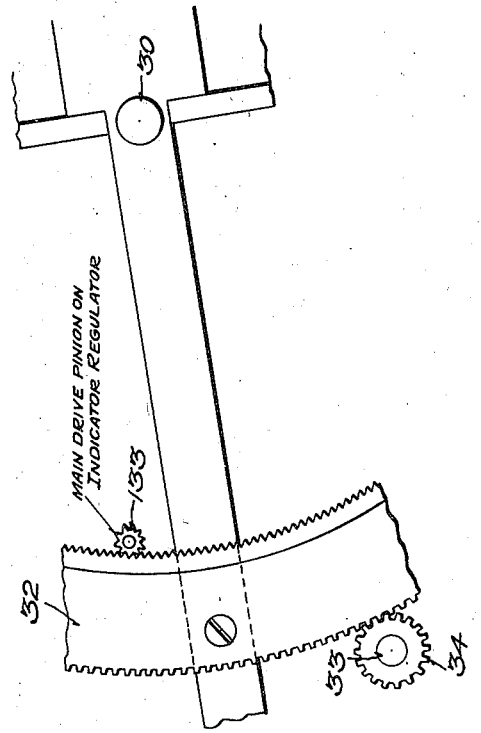
Inventor
JOSEPH H. BORDEN,

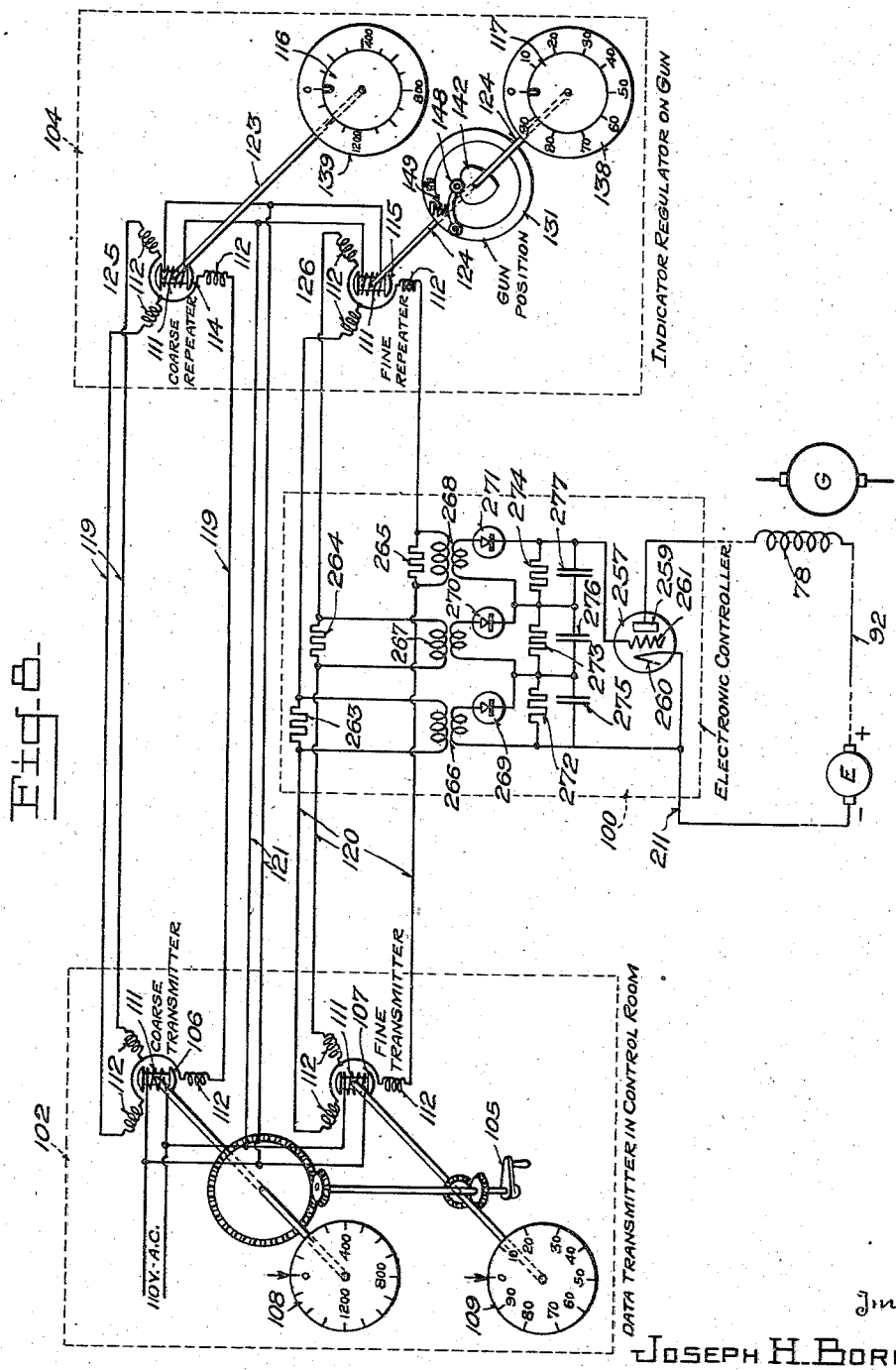

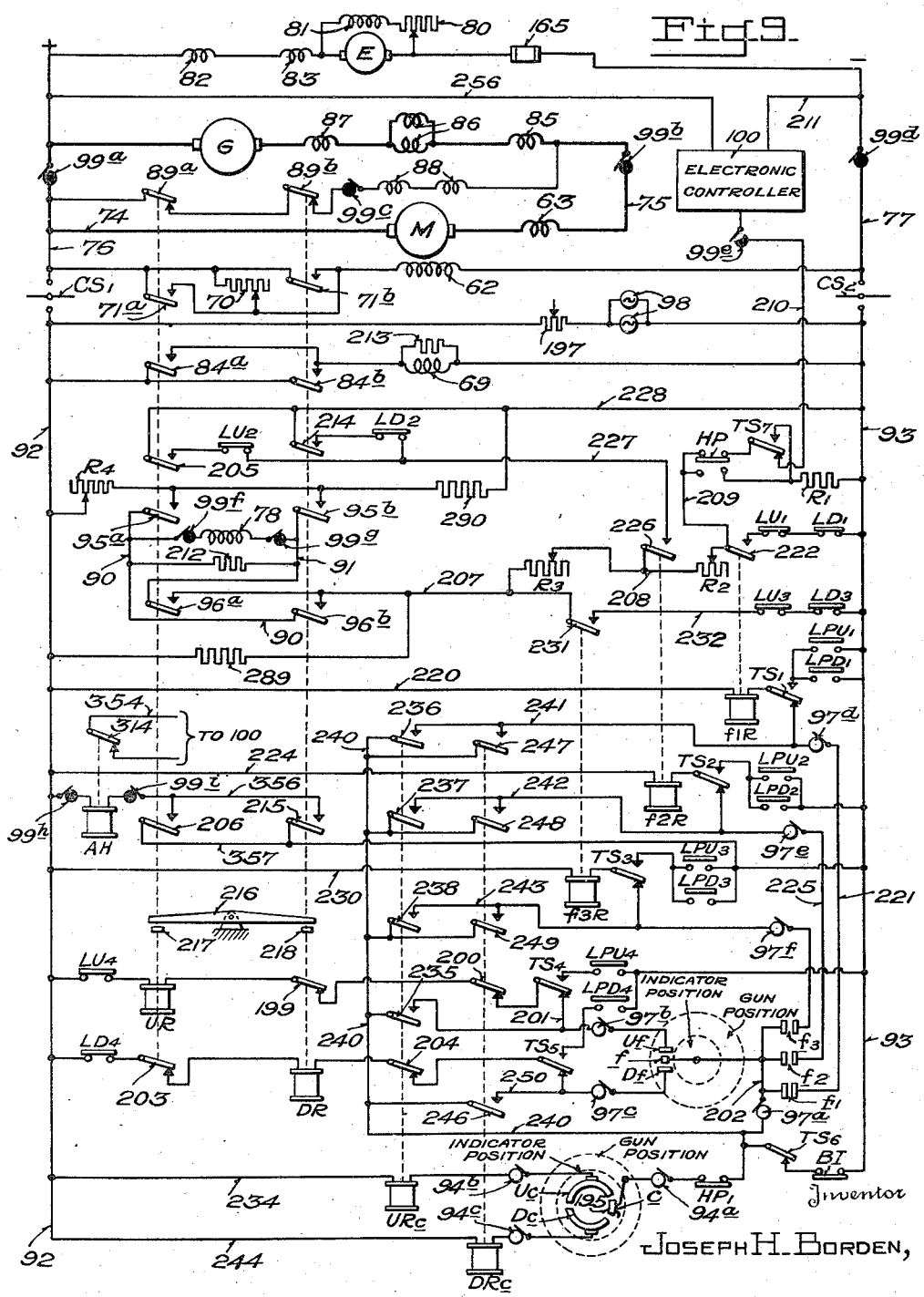

Jan. 28, 1947. J. H. BORDEN 2,414,924
ELECTRICAL SYSTEM AND APPARATUS FOR POSITIONING
GUNS AND OTHER MOVABLE OBJECTS
Filed Nov. 16, 1944

Inventor
Joseph H. Borden,

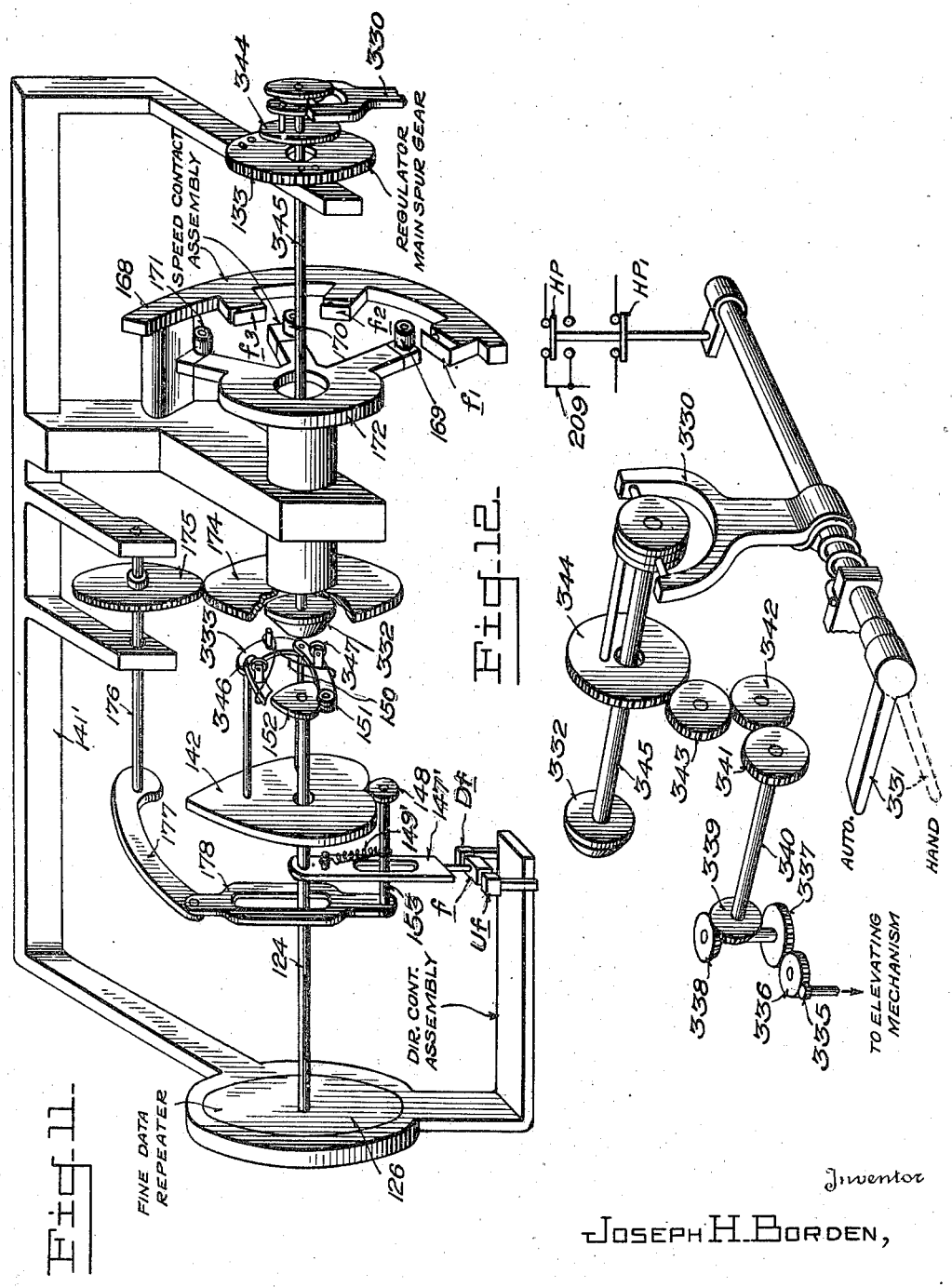

Jan. 28, 1947.   J. H. BORDEN   2,414,924
ELECTRICAL SYSTEM AND APPARATUS FOR POSITIONING
GUNS AND OTHER MOVABLE OBJECTS
Filed Nov. 16, 1944    11 Sheets—Sheet 9

Fig 13

| REGULATOR CONTACT | CLOSES AT POSITIONAL DIFFERENCE OF | GIVES GENERATOR OUTPUT VOLTAGE OF | R.P.M. BY GUN ELEVATING MOTOR OF | MILS PER SECOND GUN SPEED |
|---|---|---|---|---|
| f - Uf | + 0.3 MIL | 0 TO +4 VOLTS | 0 TO 40 FORWARD | 0 TO 3 UP |
| f - Df | - 0.3 MIL | 0 TO -4 VOLTS | 0 TO 40 REVERSE | 0 TO 3 DOWN |
| f 1 | 5 MILS ±1 | 13.5 VOLTS | 120 EITHER | 42.66 EITHER |
| f 2 | 15 MILS ±1 | 30. VOLTS | 270 " | 96.00 " |
| f 3 | 35 MILS ±1 | 65. VOLTS | 600 " | 213.33 " |
| c - Uc | +38 TO +40 MILS | +65 VOLTS | 600 FORWARD | 213.33 UP |
| c - Dc | -38 TO -40 MILS | -65 VOLTS | 600 REVERSE | 213.33 DOWN |

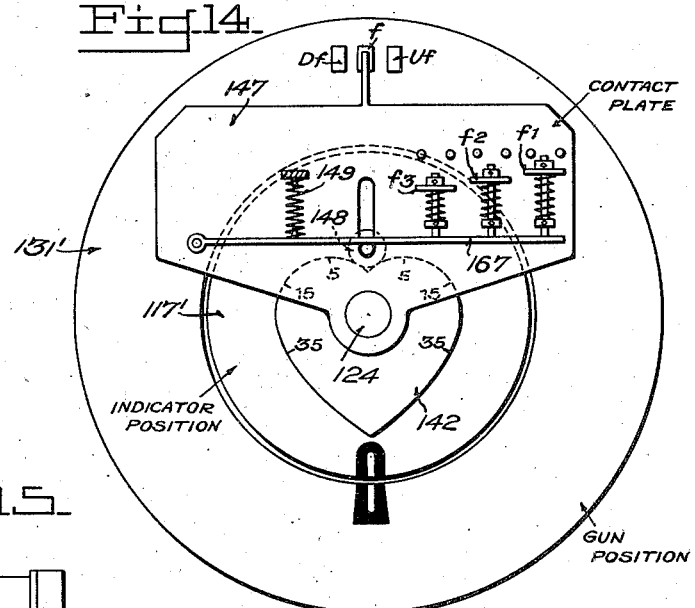

Fig 14

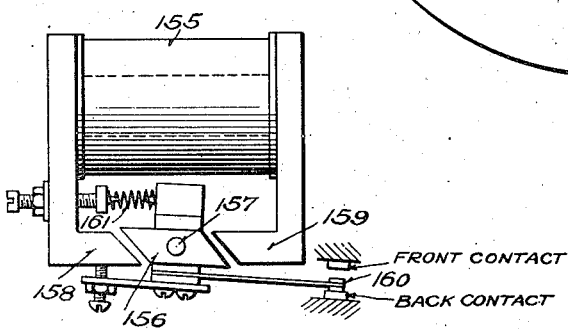

Fig 15

Inventor
Joseph H. Borden,
By C. E. Herrstrom & W. E. Thibodeau
Attorneys

Jan. 28, 1947.  J. H. BORDEN  2,414,924
ELECTRICAL SYSTEM AND APPARATUS FOR POSITIONING
GUNS AND OTHER MOVABLE OBJECTS
Filed Nov. 16, 1944  11 Sheets-Sheet 10
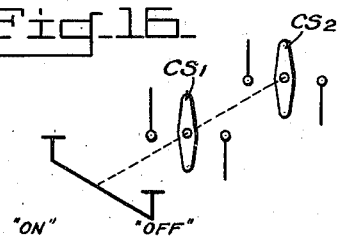
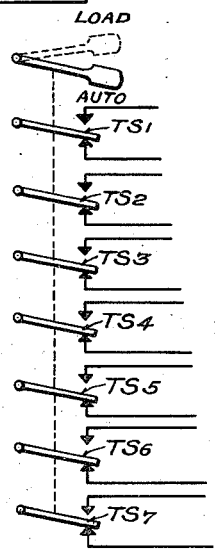
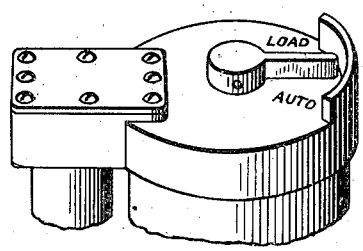
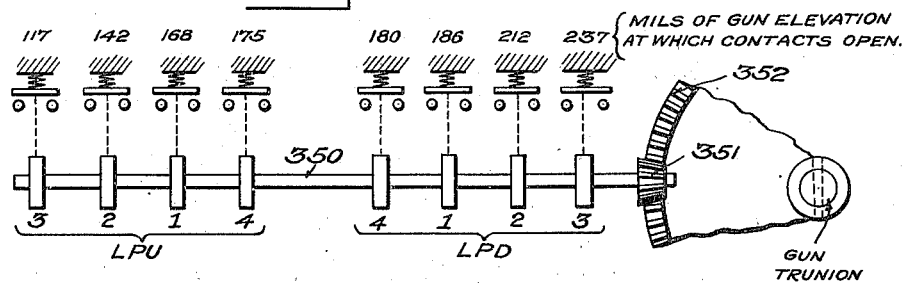
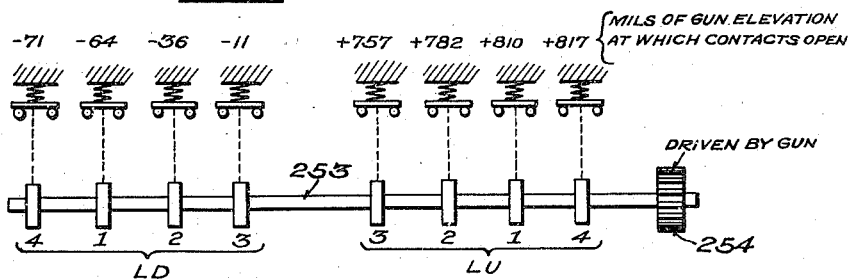
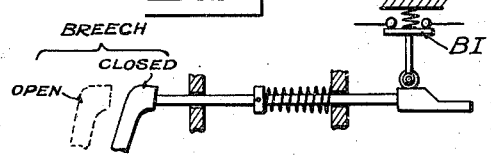
Joseph H. Borden,
By C. E. Herrstrom & W. E. Thibodeau
Attorneys

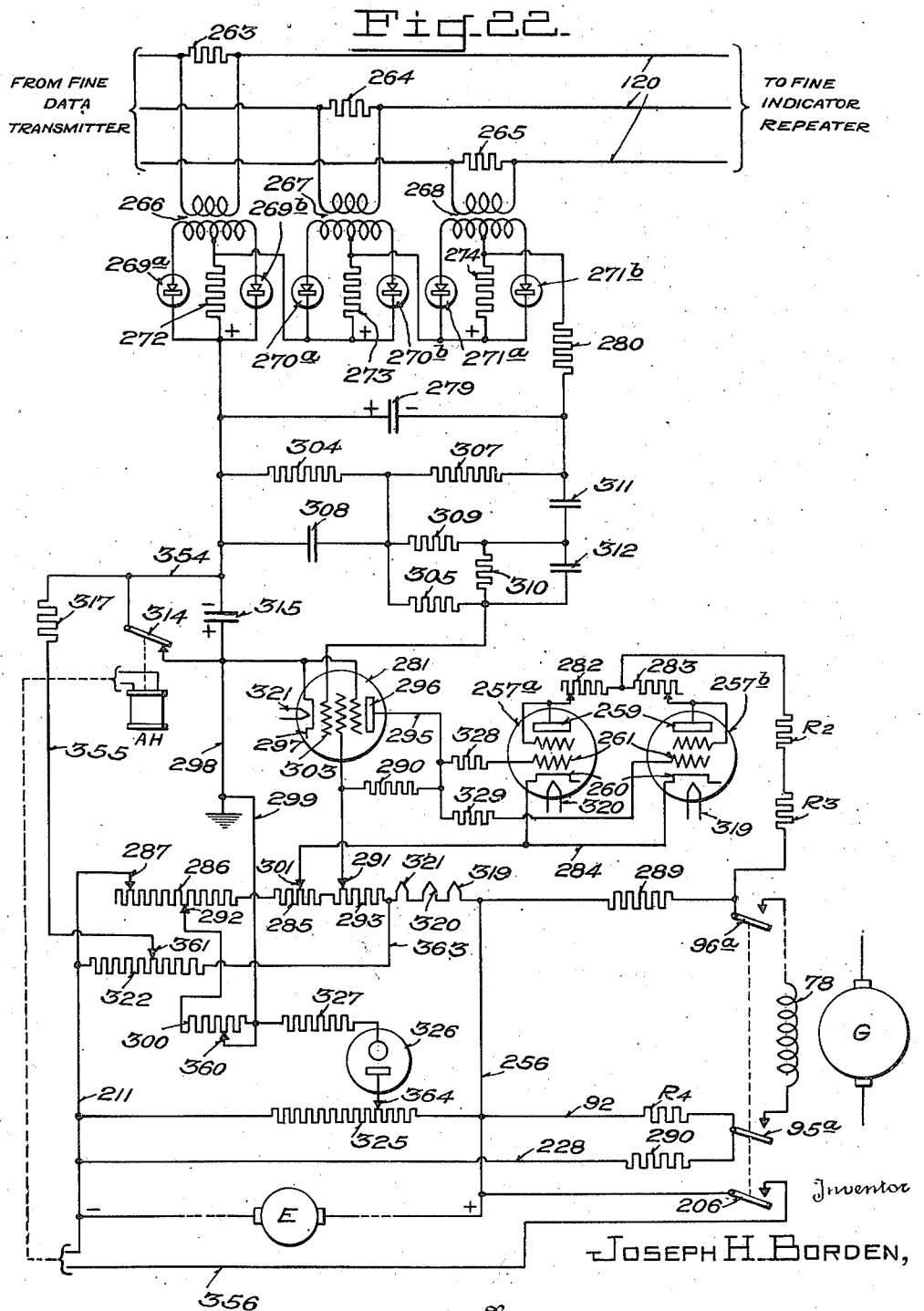

Patented Jan. 28, 1947

2,414,924

UNITED STATES PATENT OFFICE 2,414,924

ELECTRICAL SYSTEM AND APPARATUS FOR POSITIONING GUNS AND OTHER MOVABLE OBJECTS

Joseph H. Borden, Philadelphia, Pa., assignor, by mesne assignments, to Westinghouse Electric Corporation, East Pittsburgh, Pa., a corporation of Pennsylvania Application November 16, 1944, Serial No. 563,734

14 Claims. (Cl. 172—239)

My invention relates to the positioning of heavy guns, lighter firearms and other movable objects and it has special reference to systems and equipment for effecting such positioning by means of electrical power that is controlled either remotely or locally.

Broadly stated, the object of my invention is to improve the design and extend the usefulness of positioning systems wherein all movements of the controlled object are effected by an electric motor and without the aid of hydraulic devices of any kind.

A more specific object is to provide an "all electric" positioning system which is quick and accurate in its response, positive and reliable in its operation, and simple and economical in its maintenance.

Another object is to make available for seacoast and other heavy caliber guns an electrical positioning system which decreases the "dead" time incident to gun loading and thereby increases the attainable firing rate.

A further object is to make possible smooth and accurate tracking of the positioned gun in response to control indicator changes in either direction and at widely varying rates.

A still further object is to provide control apparatus that is unaffected adversely by severe jars such as are incident to gunfire.

An additional object is to provide an electrically powered gun positioning system that is controllable either automatically or manually.

In practicing my invention I attain the foregoing and other objects and advantages by: (a) including the gun positioning motor in a power supply system of the variable voltage type disclosed by expired Patent 468,100 of February 2, 1892, to H. Ward Leonard; (b) incorporating in this motor and in its power supply generator the response quickening improvements disclosed by my Patent 2,351,316 of June 13, 1944; (c) providing unique error responsive contacts, heart cam actuators, control relay combinations, Selsyn current amplifiers and other improved facilities for converting positional changes by a control indicator into generator voltages which quickly and accurately cause the motor correspondingly to position the gun in automatic "match-the-pointer" fashion; and (d) supplementing these improved facilities by novel switching devices which provide for either automatic or manual control of the system's positioning power, and which further provide for automatic movement of the gun between its loading and firing elevations.

I shall describe one representative form of electrical positioning system and apparatus embodying my invention and shall then point out the novel features thereof in claims. This illustrative embodiment is disclosed by the accompanying drawings in which:

Fig. 1 is a view in side elevation of a heavy caliber seacoast gun equipped with elevating mechanism and an electric driving motor provided with control apparatus which incorporates the improvements of my invention;

Fig. 2 is a perspective representation of an indicator regulator unit which serves to govern operation of the gun elevating motor of Fig. 1;

Fig. 3 is an enlarged showing of that indicator-regulator's "fine" set of control and gun position dials;

Fig. 4 represents elevating mechanism gear trains through which positioning movements are imparted to the gun;

Fig. 5 shows the gun barrel's toothed elevating rack with power drive and indicator pinions engaged thereby;

Fig. 6 illustrates certain details of the positioning motor's electrically released brake;

Fig. 7 indicates the basic electrical connections of that motor, its power supply generator, the generator control field winding, and the winding's energizing source;

Fig. 8 is a diagrammatic showing of connections between the indicator regulator's repeater Selsyns and the fine and coarse Selsyns of a remotely located data transmitter plus those with an electronic controller indicated in simplified schematic form;

Fig. 9 is a schematic representation of the Fig. 7 circuits together with relays, indicator regulator contacts and other control devices used in conjunction therewith;

Figs. 10-11-12 are expanded schematic showings of the Selsyn repeaters, gearing, heart cams, directional and speed contact assemblies and other elements which the indicator regulator of Fig. 2 includes;

Fig. 13 is a table presenting the results which are effected by closure of each of that regulator's several sets of contacts;

Fig. 14 is a simplified schematic representation of how the heart-cam actuated contacts of the indicator regulator selectively respond to positional error of differing direction and magnitude;

Fig. 15 depicts a preferred construction for the circuit-controlling relays of the Fig. 7-9 system;

Fig. 16 shows further schematic details of that system's control cutout switch;

Figs. 17–18 indicate in similar fashion further details of the same system's transfer switch;

Fig. 19 depicts schematically the system's loading position switch;

Fig. 20 is a similar showing of the system's limit switch;

Fig. 21 shows operating means for the gun's breech interlock contact; and

Fig. 22 is a more complete representation of the circuits which are utilized by the electronic controller of Fig. 8 to provide exceedingly fine adjustments in the generator field current.

By these drawings the improved object positioning system of my invention is shown as being applied to effect elevational control of a heavy caliber gun. As the description proceeds, however, it will become apparent that "all electric" systems incorporating my inventive improvements are likewise usable for positioning firearms of many types both in azimuth and in elevation and also for effecting an accurately controlled movement of numerous other objects.

The represented gun, carriage and elevating gearing

The illustrative firearm shown by Fig. 1 is a modern seacoast gun having a barrel 25 with six-inch bore. Through this barrel projectiles of the type shown at 26 may be fired at naval or other targets either distant or close. As supported by the represented carriage 28 the barrel of this gun can be: (a) "aimed" in azimuth by turning the entire carriage about a vertical axis of which a slip ring housing 29 defines the lower end; and (b) "laid" in elevation by raising or lowering the barrel's muzzle with respect to the horizontal.

Here considered will be only the latter or elevational control. The incident raising and lowering of the barrel's muzzle governs the range or distance the projectile will travel; it occasions a turning of the gun's trunnions 30 (see Fig. 5) in their carriage support bearings 31 (see Fig. 1); and it is imparted to the barrel through the medium of a toothed rack 32 (see Figs. 1 and 5) affixed thereto.

Serving to operate this elevating rack is a power pinion 34 (see Fig. 5) meshed with the outer teeth thereof and carried by a shaft 33 (see Figs. 4–5) to which a worm wheel 36 is secured. Serving to turn this worm wheel is a worm gear 37 mounted for rotation by a spur gear 38 formed integral with the right end thereof. This gearing is in a gear box shown at 39 (see Figs. 1 and 4) on the right side of gun carriage 28.

Driving power may be transmitted to spur gear 38 either by an electric elevating motor M (see Fig. 1) or by handwheels 44—45. Each of these sources is connectable with spur gear 38 through a selector gear 40 slidably supported by a shaft 41. Under the control of a shift lever 42 (see Figs. 1 and 4) this selector gear may either occupy the left or "power" position shown or be moved to a right or "hand" position. In the first instance, the electric drive motor M is the selected power source; in the last, the hand wheels 44—45 are substituted.

Motor M's drive connection with the selector gear 40 (set up when shift lever 42 is to the left) includes the motor shaft 46 (see Fig. 7), a coupling 47 (see Figs. 1 and 4) and a pinion 48. Through this connection "forward" rotations of the motor drive power pinion 34 (see Fig. 5) clockwise and thereby raise the gun barrel's muzzle; "reverse" rotations of the motor drive pinion 34 counterclockwise and thereby lower the muzzle.

The drive connection from hand wheels 44—45 is set up when shift lever 42 is to the right. Under this condition selector gear 40 is disengaged from motor pinion 48, meshed at its right half with a hand wheel spur gear 50, and continued at its left half in engagement with gear 38. The complete connection thus set up with the worm gear 37 further includes a hand wheel shaft 51, bevel gears 52—53, a vertical shaft 54 and bevel gears 55—56. Through this connection "forward" turnings of the hand wheels drive power pinion 34 (see Fig. 5) clockwise and thereby raise the gun barrel's muzzle; "reverse" turnings drive pinion 34 counterclockwise and thereby lower the muzzle.

Serving to lock the hand wheels against rotation when not being turned manually is a spring-held brake illustrated generally at 58. This brake (details not shown) prevents either upward or downward unbalance of the gun (as may be created by the recoil from firing) from driving the hand wheel gear train; it is, however, released by manual turning effort applied to either hand wheel and thus permits free transmission of positioning movement into the mechanism.

The improved control system and apparatus of my invention are concerned with elevational positionings of the gun which are powered by the electric motor M and which thus occur only when the shift lever 42 occupies the left position represented.

As later described in greater detail, this improved system will take intermittent data from a plotting room or continuous data from a gun data computer and immediately position the gun automatically or semi-automatically in elevation in accordance with such data. The system further includes provision for causing the gun automatically to assume the loading position upon operation of a switch; upon restoration of the switch the system returns the gun to its original position or to any new position which the plotting room data may have required in the meantime.

The gun positioning motor and brake

The represented 6-inch seacoast gun (see Fig. 1) is exceedingly heavy (its barrel, breech mechanism, recoil mechanism, etc., weight about 30,000 pounds) and hence a substantial output is required from the electric drive motor M to effect satisfactory operation of the gun's elevating mechanism.

In this illustrative application motor M is of the variable speed reversible type and has a rating of 10 horsepower; it turns in either direction at a maximum speed of 600 R. P. M. to move the gun barrel at a maximum angular rate of 213.33 mils per second (6400 mils equal to 360 degrees); it, together with a magnetic brake within an end housing 60, constitutes a completely enclosed unit; and, as already seen from Fig. 1, it is mounted on the right side frame of the gun carriage adjacent to the mechanism's gear box.

As illustratively here shown, this motor M is a direct-current four-pole machine and may satisfactorily have the internal construction in part represented by Fig. 6. It utilizes a high resistance (sometimes called "shunt") field winding 62 (see Figs. 7 and 9) that is constantly excited from any suitable direct current source of about 125 volts potential; it operates on 70 volts maximum armature voltage and has a load-speed characteristic which is essentially flat; and its maximum armature current is from 70 to 75 amperes normally but may rise as high as 200 amperes for short periods when the gun is moved at top speed from a standstill or when the gun is stopped from top speed to a standstill.

Satisfactory commutation is obtained by means of a compensating winding 63 set in the pole faces. This has been found adequate without the use of interpole windings. Four pairs of brushes are used to handle the high current required. Quick speed response to changes in the applied armature voltage is obtained by laminating the motor's pole pieces and frame and incorporating other improvements more fully explained by my Patent 2,351,316 of June 13, 1944, for "Motor control system." Detailed showing of these improvements is not here made.

Turning of this motor M when stopped is resisted by the earlier mentioned magnetic brake contained in housing 60 fastened to the motor end plate. In the illustrative form shown by Fig. 6, this brake utilizes a central metal disc 64 splined to and rotating with the motor shaft 46 plus a pair of outer discs 65 and 66 which are non-rotatably mounted.

These two outer discs are faced with brake linings 68 which normally are urged against the rotating disc's sides under the action of compression springs 67. This frictional engagement restrains the motor against rotation, it also assists in stopping the motor after each operation.

Release of the brake is effected by a magnet winding 69 which when energized electromagnetically pulls the semi-fixed disc 66 (which is of magnetic material) to the right against springs 67 that are supported from outer stationary disc 65 by studs 61. This frees the central disc 64 and the motor shaft for unrestrained rotation without drag. Brake releasing current is at proper times supplied through a contact shown at 84 in each of Figs. 7 and 9.

The motor's power supply system

Electrical power for operating motor M originates in a motor-generator set shown diagrammatically by Fig. 7. As there represented, this set includes: (a) a direct-current generator G which furnishes variable voltage power to the motor armature over a continuously-maintained connection effected by conductors 74—75; (b) a direct current exciter E which continuously energizes the motor's field winding 62 at substantially constant voltage over conductors 76—77 and through a resistor 70 that at proper times is shunted by a contact 71; (c) a main control field winding 78 for the generator which also is energized by the exciter but with current of adjustable intensity and of selectable polarity; and (d) an alternating current motor 72 which drives both the generator and the exciter at substantially constant speed.

Incorporated in the power supply system thus constituted are principles first broadly disclosed by expired Patent 468,100 of February 2, 1892, to H. Ward Leonard and since extensively employed where smooth speed control over a wide range is desired. Pursuant to those principles the speed at which gun-positioning motor M rotates is determined by how much exciting current is applied to the generator field winding 78, and the direction of motor M's rotation is determined by which of the two possible polarities the named exciting current has.

The motor generator set

In applications of the type here disclosed the motor-generator set just discussed is preferably located at some distance from the gun of Fig. 1, as in a generator room. In the illustrative arrangement shown by Fig. 7, the motor 72, the exciter E and the generator G are mounted on a common shaft 73 and otherwise mechanically organized into a single unit (details not shown) which is appropriately enclosed.

As represented, the motor 72 is an alternating current machine of the squirrel-cage induction type energized by a 3-phase power circuit of commercial voltage and frequency, such as 440 volts, 60 cycles. It has an output capacity sufficient to drive generator G under all conditions and operates at 1750 R. P. M. Other equivalent sources of mechanical power may, of course, be utilized for driving generator G and exciter E at substantially constant speed.

As represented, the exciter E is a direct current machine which normally delivers 125 to 130 volts at its output terminals and which can supply continuous loads of up to 20 amperes. Adjustment of output voltage is effected through a tapped resistor 80 in the circuit of shunt field winding 81; once set this voltage remains substantially constant from no load to full load due to the flat compounding action of a series field winding 82. Satisfactory commutation is aided by interpole windings indicated at 83.

Other equivalent sources of constant voltage direct current power can, of course, be utilized for supplying field winding current to motor M and to generator G and for also energizing relay and other control circuits later to be described by reference to the more complete diagram of Fig. 9.

As represented, the power-supply generator G for motor M is a direct current machine of four-pole construction which is capable of delivering zero to 70 volts of either polarity at load currents ranging from zero to 75 amperes and higher. Excitation appropriate for determining the polarity and magnitude of the required output voltage is provided by the generator's main control field winding 78. Through energizing circuits later to be described that winding is supplied with currents from exciter E which range from zero to about 1.2 amperes and which are of one polarity at times and of the opposite polarity at other times.

At each setting or selection of that control winding current the resultant generator output voltage rises slightly from zero load to full load on the machine. This action results from the compounding action of a series field winding 85. Interpole and compensating field windings 86 and 87 cooperate to assure satisfactory commutation under the reversible polarity and widely varying loads which the gun motor M imposes.

To handle the heavy currents required, four pairs of brushes are used in the generator. Quick output-voltage response to changes in the control field energization is obtained by laminating the generator's pole pieces and frame (not shown) and incorporating other improvements more fully explained by my earlier mentioned Patent 2,351,316.

In order to hold the generator output voltage at zero when no current is being applied to the main control field winding 78, use is made of differential field windings 88. Under the condition named these windings are bridged through contact 89 (see Figs. 7 and 9) between output conductors 74—75, and by setting up a flux in direct opposition to that produced by series field winding 85 they overcome the generator's inherent tendency to build up voltage as a result of residual magnetic flux in the field structure.

*Supply of generator excitation*

Fig. 7 shows that motor M's armature is directly connected with the output terminals of generator G and that the motor's field winding 62 is continuously energized over a direct connection with exciter E. Under these conditions: (a) "given" polarity voltage originating in generator G flows forward-direction current (from conductor 74 to conductor 75) through the motor armature to produce "forward" rotation by the motor and a raising of the gun barrel's muzzle; and (b) "opposite" polarity voltage originating in the generator flows reverse-direction current (from conductor 75 to conductor 74) through the motor armature to produce "reverse" rotation of the motor shaft 46 and a lowering of the gun. In each instance a low value of generator voltage results in a low rate of motor speed while higher values of generator voltage result in correspondingly higher speeds by the gun positioning motor M.

As earlier stated, both the polarity and the magnitude of the generator's output voltage are determined by the system's main control field winding 78. In the Fig. 7 arrangement exciting current is applied to that winding through conductors 90 and 91. When that current is of "given" polarity (conductor 90 positive with respect to conductor 91), the resulting generator output voltage also is of "given" polarity and "forward" or gun-raising rotation by motor M results; when that current is of "opposite" polarity (conductor 91 positive with respect to conductor 90) the resulting generator output voltage then is of "opposite" polarity and "reverse" or gun-lowering rotation by motor M results; and when no exciting current is applied to field winding 78 the generator output voltage is zero and the motor's shaft 46 then remains stationary.

In the case of either "given" or "opposite" polarity current applied to field winding 78, the magnitude of the resultant generator output voltage and the accompanying gun motor speed varies substantially directly with that current's intensity. Thus, when that field winding current is small the resultant generator voltage and gun positioning motor speed are correspondingly low, while when the exciting current is larger the voltage of generator G and the speed of motor M are correspondingly higher.

In the illustrative organization shown this exciting current for field winding 78 originates in the earlier-described exciter E by which conductors 76—77 are maintained at a direct current potential difference of about 125 volts; it may reach a maximum value of the order of 1.2 amperes in either direction; and it is supplied to winding 78 by control circuits and apparatus wherein the improvements of my invention are incorporated. Certain elements of these circuits are shown by Fig. 7; others by the companion diagrams of Figs. 8 and 9; and still others by succeeding drawing views.

The Fig. 7 elements include: (a) pole-changing contacts 95—96 which selectively establish "given" and "opposite" polarity connections of the field winding 78 with the power-source (exciter E) conductors 76—77 and thereby select the direction of rotation for gun-positioning motor M; (b) resistors R1—R2—R3—R4 in the excitation supply connection for adjusting and governing the speed of motor M's rotation; (c) a control cut out switch CS by which the field winding 78 may be completely disconnected from the exciter E when it is desired that the control system be rendered inactive; and (d) an electronic controller 100 by which exceedingly fine adjustments in generator excitation and gun motor speed may be effected.

Connections between the control room apparatus (exciter E and generator G) and the gun carriage apparatus (motor M) are established through electrical cables arranged as at 163 in Fig. 1 and gun slip rings indicated at 99 in the diagram of Fig. 9. Such slip rings and brushes (not shown in detail) are mounted within the gun's lower housing 29 (see Fig. 1) where they serve to permit continuous 360° rotation of the gun carriage without snarling the connecting cables.

The elements listed above function to govern operation of the gun positioning motor M. They are controlled in the novel manner which later sections of this specification describe.

*Source and transmission of control data*

Data for effecting such control originates in a control room usually located at some distance from the gun. Such data is transmitted to the gun by facilities of the type which Fig. 8 diagrammatically shows. These facilities include a data transmitter 102 in the control room, an indicator-regulator 104 on the gun, and interconnecting conductors as represented.

Need for the named control data is occasioned as follows: The projectile from a gun of the heavy-caliber type shown by Fig. 1 does not reach its target instantly, nor does it follow a straight line path. It is therefore necessary to observe the course and rate of travel of the target and then by calculation, taking into account the curved path of the projectile, time of flight and all other ballistic considerations, determine how the projectile should be directed in order that it and the target may arrive at the same point at the same time.

The computations are ordinarily made in one or the other of two ways: (a) manually on a plotting board (not shown); or (b) automatically by an electro mechanical device known as a gun data computer (also not shown). If computed manually the data is set by a hand wheel 105 into unit 102 and thereby transmitted to the gun every 15 or 20 seconds; when calculated automatically by a gun data computer the information goes into transmitter 102 directly and thence to the gun continuously as the target changes position.

In both instances the transmitter 102 utilizes course and fine transmitter units having rotors 106 and 107. These rotors are interconnected mechanically and they carry dials 108—109 which indicate the desired elevation of the gun barrel's muzzle with respect to the horizontal. The angle of one such elevation is shown at $a$ in Fig. 1.

In the illustrative transmitter shown this desired elevation is expressed in mils (6400 mils equal 360 degrees); the course dial 108 is graduated from 0 to 1600 (a 90° range); and the fine dial 109 is graduated from 0 to 100 mils (a 5.66° range). The two transmitter units are geared together with a 16 to 1 ratio; they may be turned either by handwheel 105 or by the mechanism of a gun data computer (not shown); and sixteen revolutions of the fine unit's "100 mil" rotor 107 are required to produce one revolution of the course unit's "1600 mil" rotor 106.

Each of the transmitter's two units may be of a well known "self-synchronous" type carrying a single phase winding 111 on its rotor and being provided with a field or stator structure (not shown in Fig. 8) which carries three-phase windings 112 equally spaced mechanically and interconnected as indicated. The term "Selsyn" is here identified with units of this character. In the indicator regulator 104 on the gun two other self-synchronous units (shown at 125 and 126 in Fig. 10) of similar construction are provided. These take the form of course and fine repeaters having rotors 114 and 115 (see Fig. 8) which respectively operate course and fine indicator dials shown at 116 and 117 in each of Figs. 2, 8 and 10.

The stator windings 112 of the course indicator repeater are interconnected by conductors 119 with the corresponding three-phase windings of the course transmitter unit; the stator windings of the fine indicator repeater are interconnected by conductors 120 with the stator windings 112 of the fine transmitter unit; and the rotor windings 111 of all four self-synchronous units are interconnected by conductors 121 and energized from an alternating current source of commercial voltage and frequency, such as 110 volts, 60 cycles.

By reason of these interconnections: (a) all movements of the course transmitter rotor 106 at the control station are accurately repeated by the course repeater rotor 114 on the gun; and (b) all movements of the fine transmitter rotor 107 in the control room are likewise repeated by the fine repeater rotor 115. In consequence, each reading of desired gun elevation which transmitter dials 108 and 109 in the control room show is duplicated by the indicator regulator's dials 116 and 117 on the gun.

*The indicator regulator*

The indicator regulator here represented has the physical appearance which Fig. 2 illustrates; it is mounted on top of the gun's elevating gear case in the manner shown at 104 by Fig. 1; and its course and fine indicator dials 116—117 (see Figs. 2, 8 and 10) are positioned for ready visibility at the front thereof.

The course and fine repeater units of Fig. 8 which operate those dials are housed inside of the indicator regulator's case in a manner schematically shown at 125 and 126 by Fig. 10. The rotors 114 and 115 of those repeaters (see Fig. 8) drive their dials 116 and 117, plus contact mechanisms to be described presently, by means of rotor shafts 123 and 124. Ball bearings (not shown) support those shafts for free and easy rotation, while screws 127—128 (see Fig. 10) provide for such adjustment in stator positioning as may be necessary to secure proper duplication of the transmitter unit's dial readings.

Surrounding the course and fine indicator dials 116—117 are course and fine gun dials 130—131 by which the gun's actual position of elevation is at all times indicated. These two gun dials are mechanically interconnected by 16 to 1 ratio gearing represented schematically in Fig. 10 as including a shaft 132; both are driven directly from the gun's toothed elevating rack 32 by a pinion 133 meshed with the rack as shown in Fig. 5.

This pinion 133 is carried on the end of a shaft 134 (see Fig. 10) which protrudes through the rear of the indicator regulator's case 104 (see Figs. 1 and 2) to maintain the meshed-pinion relation of Fig. 5. That shaft 134 imparts its rotation to the course and fine gun dials 130—131 through bevel gears represented at 135—136 (again see Fig. 10); and the gear train of which it forms a part causes those two dials at all times to register the exact elevational position of the gun.

Surrounding each of the indicator regulator's two sets of indicator-gun dials 116—130 and 117—131 is a stationary reference scale arranged as shown at 138 in Fig. 3. That outer scale is graduated from 0 to 100 mils and hence is appropriate for use with the fine set of indicator-gun dials 117—131 of Fig. 2; a corresponding reference scale 139 graduated from 0 to 1600 mils is provided for the course set of indicator-gun dials shown at 116—130 in Fig. 2.

Scale organizations of this Fig. 3 type are characteristic of "match-the-pointer" systems of object positioning. In them the pointer or marker carried by each of the inner dials takes the dial's position reading from the outer reference scale 138, and variance between readings for the two inner dials (indicator and gun) defines the magnitude of positioning error to be corrected.

In the illustrative conditions of Fig. 3 the indicator dial 117 shows 15 mils as the desired position of gun elevation; the gun dial 131 shows an actual position of only 10 mils elevation; and the error to be corrected thus is 5 mils. To eliminate this error and thereby "match" the pointers, the gun must be elevated by an additional 5 mils.

*The fine directional contacts*

The presence of such positional error is registered by the indicator regulator through the medium of contacts which are organized in a manner schematically indicated by Fig. 14 and which are physically included in a spider and slip ring assembly (slip rings shown only in Fig. 9) represented at 141 in Figs. 10—11.

These fine directional contacts are operated by the fine data repeater 126 (see Fig. 10); they include a central member f rotated by fine repeater shafts 124 (Figs. 10, 11, 14) through a linkage which includes a large heart cam 142; and they further include "up" and "down" members Uf and Df carried by the gun-driven assembly 141.

That assembly 141 at all times registers the elevational position of the gun, it is driven from the barrel's toothed rack 32 (see Fig. 5) through indicator pinion 133, shaft 134 and other suitable gearing represented at 143—144—145 in Fig. 10. Contacts Uf and Df carried thereby thus always shift their position around shaft 124 in exact unison with changes in gun elevation.

For clarifying explanation, the representation of Fig. 14: (a) shows contacts Uf and Df as being mounted directly on a replica 131' of the indicator regulator's fine gun dial 131 (see Figs. 2–3, 8, 10–11); (b) shows the heart cam 142 as being connected for direct rotation with a replica 117' of the regulator's fine indicator dial 117 (again see Figs. 2–3, 8, 10–11); and (c) shows the central contact f as being carried by a support 147 which is rotatively journaled on the fine repeater's shaft 124 but which is urged, through heart cam 142 and a roller 148 held thereagainst by a spring 149, to follow all rotative movements which that shaft makes.

As long as the indicator and gun dials 117'—131' have the "matched" position which Fig. 14 shows, indicator contact *f* stays midway between contact U*f* on one side and contact D*f* on the other. In the event, however, of clockwise rotation by the indicator dial 117' in response to a need for added gun elevation, fine contact *f* is moved into engagement with "up" contact U*f*; likewise, in the event of counterclockwise rotation of dial 117' in response to a need for a lowering of the gun, fine contact *f* is similarly moved into engagement with "down" contact D*f*.

Once either of these engagements has been established continued rotation of the fine repeater shaft 124 causes the notch (minimum diameter) of heart cam 142 to move from beneath roller 148. This forces that roller away from shaft 124 against spring 149 and progressively intensifies contact *f*'s engagement with side contact U*f* or D*f*. Such intensification results from the heart cam's progressively increasing radius between the notch and the heart's point.

As the indicator and gun dials 117'—131' are brought back toward their matched position of Fig. 14, spring 149 causes roller 148 to ride downwardly along the heart cam toward and finally into the cam's notch. Until, however, the latter position is fully reached contact *f* is held in continuous engagement with the side contact U*f* or U*d* against which it was initially moved.

Utilizing the principles just explained is one preferred form of fine directional contact organization represented by Fig. 11. This organization is included in the earlier mentioned spider and slip ring assembly 141 of Fig. 10. That assembly actually takes the form of a cylindrical shell or housing which turns on ball bearings (not shown); in Fig. 11, however, it is represented as an angular support 141' which lends itself to clearer schematic illustration of the inner details.

This cylindrical housing 141 is equipped with slip rings through which electrical connections between the indicator regulator's contacts and external circuits are established. Such slip rings are not shown by Figs. 10-11 but they are indicated at 97a—97b—97c (and at 94a—94b—94c) in the schematic diagram of Fig. 9.

In the expanded representation of Fig. 11: (a) the "up" and "down" contact members U*f* and D*f* are shown in simplified form as being directly mounted on an extension of the spider support 141' which is geared to the gun in the manner shown at 141 in Fig. 10; (b) the fine central contact *f* is carried by a slotted link support 147' corresponding to element 147 of Fig. 14; (c) the large heart cam 142 is loosely mounted on the fine Selsyn shaft 124 but coupled therewith through a spring loaded clutch roller 151 bearing on a small heart cam 152 fixed to shaft 124; (d) contact *f*'s support member 147' is coupled with the large heart cam 142 through an extension pin 153 by which roller 148 is carried; and (e) a tension spring 149' urges roller 148 into the heart cam's notch.

These fine directional contacts close in response to relatively small positional differences between the gun of Fig. 1 and the data transmitter 102 of Fig. 8 by which it is controlled. For the illustrative indicator regulator here represented these differences are of the order of about 0.3 mil. Hence, whenever indicator dial 117 moves forward (clockwise) ahead of gun dial 131 by 0.3 mil or more (see Fig. 3) fine contact *f* engages with "up" contact U*f* (see Figs. 11 and 14); likewise, whenever the indicator dial moves backward (counterclockwise) away from the gun dial by 0.3 mil or more, contact *f* engages with "down" contact D*f*.

The speed changing contacts

For selectively registering positional differences having magnitudes greater than the 0.3 mil value just stated, the indicator regulator is further equipped with speed changing contacts represented at *f*1—*f*2—*f*3 in each of Figs. 11 and 14. In the illustrative organization shown: (a) contact *f*1 closes in response to positional differences of 5 mils and greater; (b) contact *f*2 responds to differences of 15 mils and greater; and (c) contact *f*3 closes when the difference between indicator and gun dials 117—131 (see Fig. 3) exceeds 35 mils.

The named responses occur for both upward (gun needs to be raised) and downward (gun needs to be lowered) corrective control indications. They are effected by action of the large heart cam 142 rotated by the fine repeater's shaft 124 (see Figs. 11 and 14) as already described.

In the explanatory representation of Fig. 14 contacts *f*1—*f*2—*f*3 are shown as being actuated by a bar 167 pivoted at its left end to support plate 147, and urged by spring 149 toward the indicator repeater shaft 124 and against cam roller 148. Through this linkage, heart cam 142 moves bar 167's right end outwardly away from shaft 124 by a distance which increases with the positional difference between indicator and gun dials 117' and 131'.

As long as this difference remains less than 5 mils, contacts *f*1—*f*2—*f*3 all continue open because roller 148's engagement with large heart cam 142 then is relatively close to that cam's notch (point of minimum radius). When, however, the positional difference between the gun and its control indicator becomes 5 mils or more in either direction contact *f*1 is by bar 167 moved to the closed position as a result of roller 148 then engaging the heart cam 142 at some point outside of the small radius range marked 5—5 in Fig. 14; further difference increases to 15 mils or more in either direction further effect the closure of contact *f*2 by moving the roller-to-cam engagement point beyond the larger radius range marked 15—15 on the cam; and still further difference increases to 35 mils or more in either direction still further effect a closing of contact *f*3 by moving the roller-to-cam engagement point beyond the increased radius range marked 35—35 on the cam.

As the positional difference (either direction) between the control indicator and gun dials 117' and 131' is decreased, speed-changing contacts *f*3—*f*2—*f*1 will successively open in that named order. This and earlier described actions are summarized by the table of Fig. 13.

Utilizing the principles just explained is one preferred form of speed changing contact organization represented by Fig. 11. This organization is included in the earlier discussed spider and slip ring assembly 141 of Fig. 10 shown in Fig. 11 as an angular support 141'.

In that expanded showing of Fig. 11: (a) the speed changing contact members *f*1—*f*2—*f*3 are schematically indicated as being carried on the inside of a ring section 168 supportedly fixed to the gun driven spider 141'; (b) actuating rollers 169—170—171 for those contacts are shown as being carried by a support member 172 which is rotated with respect to contact ring 168 by a linkage of which large heart cam roller 143 forms a part; and (c) that linkage is shown as including meshed gears 174—175, shaft 176, arm 177, link 178, cam roller 148, and large heart cam 142.

Positional differences in either direction between the gun driven assembly 141' and the control indicator shaft 124 ride roller 148 away from the notch (minimum radius) of large heart cam 142 and successively close speed changing contacts f1—f2—f3 in the manner summarized by Fig. 13 and previously explained (see Fig. 14).

Connections between these speed changing contacts and circuits external to the indicator regulator are established through the earlier mentioned slip rings indicated at 97d—97e—97f in the schematic diagram of Fig. 9.

*The coarse directional contacts*

As will become more evident presently, positional errors of up to 35 mils and somewhat above can satisfactorily be corrected by the fine speed changing and directional contacts just described; greater errors cannot, however, always be so corrected with sufficient rapidity by those contacts acting alone.

To provide for positional differences of more than 35 mils between the gun of Fig. 1 and its controlling data transmitter 102 of Fig. 8, the indicator regulator 104 here disclosed is still further equipped with coarse directional contacts represented at Uc—c—Dc in Fig. 10.

Coarse contact c takes the form of a brush supported from the periphery of a worm wheel 180. That wheel at all times registers the position of the gun. Its driving connection is shown as including a worm gear 181, bevel gears 182—183, shaft 184, and the regulator pinion 133 which directly meshes with the gun's elevating rack 32 (see Fig. 5).

"Up" and "down" coarse contacts Uc and Dc take the form of a pair of ring segments shown in Fig. 10 as being carried by a shaft 185 which is coaxial with brush contact c's support wheel 180. That shaft 185 receives rotative movements from the coarse repeater's shaft 123 through a driving connection shown as including spur gears 186—187 plus a coarse heart cam 190 fixed to shaft 123 and bearing against a roller 191 carried by gear 187.

In the illustrative arrangement shown, only one side (marked k—z in Fig. 10) of the coarse heart cam is used in effecting this rotation. Roller 191 is held against the cam by a tension spring 192 acting through a segment gear 193 in the manner shown. In rotating through the gun's complete range of elevational adjustment (shown in Figs. 1 and 20 as restricted to about 900 mils or 50°) coarse repeater shaft 123 turns heart cam 190 through the angular range indicated at k—z in Fig. 10. Wider ranges of gun adjustment may readily be provided for through reshaping of cam 190.

The complete contact ring of which segments Uc and Dc form a part includes a third or "dead" segment having the relative shortness shown at 195 in Fig. 10. The complete ring thus is similar to a three segment commutator in which two segments are long and one short. Each of the three segments is insulated from the other two.

The ring's dead segment 195 is engaged by coarse contact c whenever the gun and control indicator positions are substantially matched; it is, moreover, of such length that a positional error of from 38 to 40 mils in either direction must be present before movement from beneath contact c will be effected.

If the error calls for a raising of the gun to restore matching, "up" contact segment Uc is then moved into engagement with brush contact c; if, however, the error calls for a lowering of the gun, then "down" segment Dc establishes similar engagement with coarse contact c. Once established each of these engagements continues uninterruptedly until error reduction to about 38 mils has been effected.

Connections between these coarse directional contacts Uc—c—Dc and circuits external to the indicator regulator are established through slip rings (not shown in Fig. 10) indicated at 94a—94b—94c in the schematic diagram of Fig. 9.

*The system's relays and control circuits*

Translation of the just described functionings by the indicator regulator's several contacts into appropriate operations by the gun positioning motor M is effected through the medium of the several relays which the schematic diagram of Fig. 9 shows.

There represented are: (a) "up" and "down" field relays UR and DR by which "raising" and "lowering" operations of motor M are respectively initiated; (b) "low," "medium" and "high" speed control relays f1R—f2R—f3R by which the speed of each of those operations is governed; (c) coarse directional relays URc and DRc by which motor operation is especially governed under conditions of large error; and (d) an electronic controller relay AH.

All of these relays (with the exception of AH) preferably are mounted on the gun carriage of Fig. 1, as in a box there shown at 154. Such a mounting keeps the equipment close together and reduces the number of leads requiring slip rings between the gun and electrical conductors leading therefrom.

Each of the above named relays preferably is of the construction which Fig. 15 illustrates. In the device there shown, the usual operating winding 155 serves when energized to circulate flux through a magnetic circuit wherein an armature 156 is included. This armature is of a unique balanced design, and it is pivoted at its center 157 between pole pieces 158—159 having faces tapered as shown. Such construction affords immunity to mechanical shock such as is occasioned by gunfire.

Actuated by the relay's armature 156 are several sets of contacts of the type which Fig. 15 shows. Each set includes a movable member 160 carried by the armature and normally urged by a compression spring 161 against a stationary "back" contact. When, however, winding 155 becomes energized, armature 157 is by magnetic attraction rotated counterclockwise to overcome the force of that spring and thereby move member 160 into engagement with a stationary "front" contact. In the former or de-energized condition the relay is said to be "released"; in the latter or energized condition the relay is said to be "picked up."

Each relay winding has, of course, the physical form shown at 155 by Fig. 15. In the circuit diagram of Fig. 9, however, each such winding is represented as a simple block directly over the relay's designation. All contacts actuated by each winding are, moreover, identified therewith by a vertical dotted line. Fig. 9 makes no reproduction of the relay armatures 156 (see Fig. 15); all windings are there shown de-energized; and all contacts are these shown released ("back" closed and "front" open).

The necessary voltage for energizing the relay windings is shown in Fig. 9 as being supplied from the previously described exciter E (see Fig. 7). By this source there is made available between "positive" conductor 92 and "negative" conductor 93 a substantially constant direct current potential of about 125 volts. Included in the exciter supply connection represented are a protective fuze 165, gun slip rings 99a and 99d, and control cut out contacts CS1—CS2.

The control cut out switch of which these contacts form a part is mounted on the gun carriage at the position marked CS in Fig. 1. Satisfactorily it may be of the push button type shown in Fig. 16 as having an "off" position wherein the contacts are open and an "on" position wherein the contacts are closed.

Such closure results in a lighting of pilot lamps 98 (see Figs. 1 and 7) over a circuit wherein a light-voltage-adjusting resistor 197 is included. Such lighting indicates that conductors 92 and 93 (see Figs. 7 and 9) are connected with their control voltage source E and that the Fig. 9 control system for motor M is thereby conditioned for operation.

For purposes of clarifying explanation of that operation numerous elements originally shown by the basic motor circuit diagram of Fig. 7 have been reproduced by the control schematic diagram of Fig. 9. These include all windings of the exciter E, of the generator G and of the motor M; also the motor's electrically released brake.

*Fine directional control of motor*

Interposed between the indicator regulator's fine directional contacts Uf—f—Df and the main control field winding 78 of the gun motor's supply generator G are the earlier named fine directional relays shown at UR and DR in Fig. 9. By these two relays "raising" and "lowering" operations of the gun elevating motor M are respectively governed.

With Fig. 9's control cut out switch CS in the "on" position, closure of the indicator regulator's gun "raising" contacts f—Uf picks up the "up" field relay UR over a circuit shown in Fig. 9 as extending from the positive supply conductor 92, through a limit switch contact LU4, the UR relay winding, a back contact 199 of relay DR, a back contact 200 of relay DRc, a transfer switch contact TS4, conductor 201, regulator slip ring 97b, the fine control contacts Uf—f, conductor 202, regulator slip ring 97a, a transfer switch contact TS6, and a breech interlock contact BI back to negative supply conductor 93.

Thus energized relay UR opens its two back contacts 89a—203 and closes its six front contacts 71a—84a—95a—96a—205—206. Opening of contact 89a breaks the circuit of differential windings 88 (see Fig. 7) and conditions the generator G for build up of motor energizing voltage; closing of contact 71a by-passes resistor 70 and applies full excitation to the motor's field winding 62 (see Fig. 7); closing of contact 84a energizes the brake winding 69 and thereby frees the motor shaft 46 (see Fig. 7) for rotation; closing of contact 206 picks up the electronic controller relay AH for a purpose later described; and closing of contacts 95a—96a establishes a circuit through which exciting current of "given" polarity is applied to the main control field winding 78 of generator G.

The path taken by this "given" polarity current extends from positive supply conductor 92, through field resistor R4, UR's front contact 95a, conductor 90, gun slip ring 99f, the generator field winding 78, gun slip ring 99g, conductor 91, UR's front contact 96a, conductor 207, field resistor R3, conductor 208, field resistor R2, conductor 209, a control selector contact HP, transfer switch contact TS7, conductor 210, gun slip ring 99e, the electronic controller 100, and conductor 211 back to the negative side of exciter E. Under certain conditions the position of one or the other of contacts HP and TS7 is shifted; in that event the electronic controller 100 has a field resistor R1 substituted for it in the field winding circuit just traced.

The given polarity exciting current (conductor 90 positive with respect to conductor 91) thus applied to the main control field winding 78 builds up in generator G's armature a given polarity voltage which flows through the gun positioning motor M forward-direction current (from conductor 74 to conductor 75) by which "forward" or gun raising rotation by the motor is produced. Such rotation has a speed that is determined in a manner later to be explained; once initiated it continues until the "up" field control relay UR is restored to the de-energized or released condition.

Such restoration is produced either by an opening of the indicator regulator's fine directional contacts f—Uf or by a break at some other point in relay UR's winding energizing circuit (earlier traced). Upon de-energization produced in either way, relay UR reopens its six front contacts and recloses its two back contacts, thereby returning to the condition which Fig. 9 shows.

Under that condition, contacts 95a—96a remove all exciting current from main control field winding 78 and by causing generator G to cease its supply of forward driving current to motor M bring that motor to a stop; contact 84a de-energizes brake winding 69 and thereby restores braking force to the motor shaft 46 (see Fig. 7); contact 71a reinserts current-reducing resistor 70 into the energizing circuit for motor field winding 62; and contact 89a reconnects differential field windings 88 across generator G's armature.

By Figs. 7 and 9: (a) the generator's main control field winding 78 is shown as having a shunting resistor 212 continuously connected thereacross; and (b) the motor brake release winding 69 is shown as being provided with a similar shunting resistor 213. Each of these provisions is desirable in that it assures more gradual dying away of the winding's magnetic flux upon interruption of winding energizing current; this, in turn, minimizes sparking at the relay contacts and otherwise improves operation of the system.

With the motor control system inactive as shown in Fig. 9 (but with switch CS of Fig. 16 still "on"), closure of the indicator regulator's gun "lowering" contacts f—Df picks up the "down" field relay DR over a circuit represented as extending from the positive supply conductor 92 through a limit switch contact LD4, a back contact 203 of relay UR, the DR relay winding, a back contact 204 of relay URc, a transfer switch contact TS4, slip ring 97c, the indicator regulator's fine contacts Df—f, conductor 202, slip ring 97a, transfer switch contact TS6, and breech interlock contact BI back to the negative supply conductor 93.

Thus energized relay DR opens its two back contacts 89b—199 and closes its six front contacts 71b—84b—95b—96b—214—215. Opening of contact 89b breaks the circuit of differential windings 88 and conditions the generator G for build up of motor energizing voltage; closing of contact 71b by-passes resistor 70 and applies full excitation to the motor's field winding 62; closing of contact 84b energizes the brake winding 69 and thereby frees the motor for rotation; closing of contact 215 picks up the electronic controller relay AH; and closing of contacts 95b—96b establishes a circuit through which exciting current of "opposite" polarity is applied to the main control field winding 78 of generator G.

The path taken by this "opposite" polarity current extends from positive supply conductor 92, through field resistor R4, UD's front contact 95b, conductor 91, gun slip ring 99g, the generator field winding 78, gun slip ring 99f, conductor 90, DR's front contact 96b, conductor 207, resistors R3 and R2, conductor 209 and electronic controller 100 (or resistor R1) back to the negative side of exciter E.

The opposite polarity exciting current (conductor 91 positive with respect to conductor 90) thus applied to the main control field winding 78 builds up in generator G's armature an opposite polarity voltage which flows through the gun positioning motor M reverse-direction current (from conductor 75 to conductor 74) by which "reverse" or gun lowering rotation of the motor is produced. Once so initiated such rotation continues (at a speed determined as later described) until the "down" field control relay DR is restored to the de-energized or released condition.

Such restoration is produced either by an opening of the indicator regulator's fine directional contacts f—Df or by a break at some other point in relay DR's winding energizing circuit (earlier traced). Upon such de-energization, relay DR reopens its six front contacts and recloses its two back contacts, thereby returning to the condition which Fig. 9 shows.

Under that condition, contacts 95b—96b remove all exciting current from main control field winding 78 and by causing generator G to cease its supply of reverse driving current to motor M bring that motor to a stop; contact 84b de-energizes brake winding 69 and thereby restores braking force to motor M's shaft; contact 71b reinserts resistor 70 into motor field winding 62's energizing circuit; and contact 89b reconnects differential field windings 83 across the generator armature. By these actions the motor control system is again restored to the inactive condition which Fig. 9 represents.

Selective pick up of "up" and "down" field control relays UR and DR is a system characteristic and is effected as just described; however, simultaneous pick up by these two relays is never desired, since such would result in excessive current drain on exciter E and possible damage to the relay contacts.

Two safeguards against such simultaneous pick up are incorporated in the system of Fig. 9. The first takes the form of back contacts 203 and 199 earlier mentioned as being carried by the two relays under discussion. These contacts are arranged for an "electrical interlock" functioning. Thus, whenever relay UR is picked up, its then opened contact 203 prevents energizing current from reaching the winding of relay DR; likewise, whenever relay DR is picked up its then opened contact 199 prevents energizing current from reaching the winding of relay UR.

The second safeguard takes the form of a "mechanical interlock" schematically shown in Fig. 9 as a bar 216 pivotally supported at its center and being engageable at its two ends by mechanical extensions 217 and 218 of the two relay's armatures (not shown in Fig. 9 but see Fig. 15). Whenever relay UR is picked up, its armature extension 217 rocks interlock bar 216 clockwise and makes pick up by relay DR mechanically impossible; likewise, whenever relay DR is picked up, its armature extension 218 rocks the interlock bar counterclockwise and then makes pick up by relay UR mechanically impossible.

*Speed changing control of motor*

It has now been seen: (1) how "forward" or raising operations by the gun positioning motor M are effected through the "up" field relay UR upon closure of the indicator regulator's fine "raising" contacts f—Uf; and (2) how "reverse" or gun lowering operations by motor M are effected through the "down" field relay DR upon closure of the indicator regulator's fine "lowering" contacts f—Df.

The speed at which motor M rotates during each such operation is determined by how much exciting current (of either "given" or "opposite" polarity) is passed from exciter E through generator G's main control field winding 78. When that current is zero the gun positioning motor M does not rotate at all; when that current is of a low value the resultant generator voltage and gun motor speed are correspondingly low; and when that current is increased, generator G's output voltage and motor M's speed of rotation are correspondingly raised.

Normal functioning of the motor control system calls for generator field winding currents of from exceedingly low values up to about 1.2 amperes. To effect the necessary adjustments in accordance with the Fig. 9 system's actual requirements of gun positioning speed use is made of: (a) resistors R1—R2—R3—R4 series connected as shown by Figs. 7 and 9 in the energizing circuit for generator G's main control field winding 78; (b) speed control relays f1R—f2R—f3R which when actuated respectively by-pass resistors R1—R2 and R3 and thereby increase the generator field winding current in relatively substantial increments; (c) the indicator regulator's speed selecting contacts f1—f2—f3 (earlier described in connection with Figs. 11 and 14) by which relays f1R—f2R—f3R are respectively picked up; and (d) the electronic controller 100 (see Figs. 7–8–9, 22 and the description of a later section) by which exceedingly fine adjustments in generator field current are effected.

Upon initial closure of either of the indicator regulator's "raising" and "lowering" sets of fine directional contacts f—Uf and f—Df, all three of the speed selecting contacts f1—f2—f3 are open as shown by Fig. 14; all three of the speed control relays f1R—f2R—f3R are de-energized and hence released as shown by Fig. 9; and none of the resistors R1—R2—R3 is by-passed from the current supply circuit for generator field winding 78. Under this condition the current through that circuit is of a comparatively low value and results in a gun motor speed having a "tracking" value of 40 R. P. M. or less.

Subsequent closure of the indicator regulator's first speed contact f1 (see Fig. 14) picks up the low speed relay f1R over a circuit shown in Fig. 9 as extending from the positive supply conductor 92 through conductor 220, the f1R relay winding, a transfer switch contact TS1, regulator slip ring 97d, conductor 221, the speed contact f1, regulator slip ring 97a, transfer switch contact TS6, and breech interlock contact BI back to the negative supply conductor 93.

Thus energized relay f1R closes its front contact 222 and thereby places a by-pass connection across resistor R1 (and the electronic controller 100). This connection is shown in Fig. 9 as extending from conductor 209 (joined with resistor R2's tap) through relay f1R's now closed contact 222, a limit switch contact LU1, and another limit switch contact LD1 back to the negative supply conductor 93. Under this condition the current through generator field winding 78 is sufficiently increased to give a "low" gun motor speed of about 120 R. P. M.

Subsequent closure of the indicator regulator's second speed contact f2 (again see Fig. 14) picks up the medium speed relay f2R over a circuit extending from the positive supply conductor 92 through conductor 224, the f2R relay winding, a transfer switch contact TS2, regulator slip ring 97e, conductor 225, the speed contact f2, conductor 202, regulator slip ring 97a, transfer switch contact TS6, and breech interlock contact BI back to the negative supply conductor 93.

Thus energized relay f2R closes its front contact 226 and thereby places across resistor R2 a by-pass connection shown as extending from that resistor through conductor 208, f2R's contact 226, conductor 227, a limit switch contact LU2 (or LD2), front contact 205 of "up" relay UR (or front contact 214 of "down" relay UD), and conductor 228 back to the negative supply conductor 93. Under this condition the current through generator field winding 78 is still further increased to give a "medium" gun motor speed of about 270 R. P. M.

Still subsequent closure of the indicator regulator's third speed contact f3 picks up the high speed relay f3R over a circuit extending from the positive supply conductor 92 through conductor 230, the f3R relay winding, a transfer switch TS3, regulator slip ring 97f, the speed contact f3, conductor 202, regulator slip ring 97a, transfer switch contact TS6 and breech interlock contact BI back to the negative supply conductor 93.

Thus energized relay f3R closes its front contact 231 and thereby places across resistor R3 a by-pass connection shown as extending from that resistor through conductor 207, f3R's contact 231, conductor 232, limit switch contact LU3 and limit switch contact LD3 back to the negative supply conductor 93. Under this condition the current through generator field winding 78 is brought up to its maximum value by which a "high" gun motor speed of about 600 R. P. M. is produced.

Upon initial installation of the Fig. 9 motor control system, the following adjustments of field resistors R1—R2—R3—R4 are preferably made. With all three relays f1R—f2R—f3R picked up as just described, resistor R4's tap is positioned to give the stated "high" speed of 600 R. P. M. by motor M; with relays f1R and f2R only picked up, resistor R3 is next adjusted to give the stated "medium" motor speed of 270 R. P. M.; with relay f1R only picked up, resistor R2 is adjusted to give the stated "low" motor speed of 120 R. P. M.; and with all three relays released as shown in Fig. 9 resistor R1 is adjusted to give an unchanging slow speed within the stated "tracking" range of below 40 R. P. M.

Other speeds within this tracking range are made available by the electronic controller 100 indicated generally in Figs. 8-9-10, shown in greater detail by Fig. 22, and described by a later section of this specification.

Since the indicator regulator's speed changing contacts always close in the sequence of f1—f2—f3 and always open in the reverse sequence of f3—f2—f1, the resistor-shunting relays which those contacts control thus always pick up in the sequence of f1R—f2R—f3R and always release in the reverse sequence of f3R—f2R—f1R. When governed by the indicator regulator's fine directional and speed changing contacts of Figs. 11 and 14, the speed of gun positioning motor M thus always builds up through the control settings of 40-120-270-600 R. P. M. and always decreases through the settings of 600-270-120-40 R. P. M.

*Coarse directional control of motor*

Positional errors between the gun of Fig. 1 and its control transmitter 102 (see Fig. 8) of up to about 38 mils can satisfactorily be corrected by the just described fine directional and speed changing control facilities for motor M; greater errors, however, further bring into action certain coarse directional control facilities which will now be explained. Those coarse control facilities include: (a) the indicator regulator's earlier described coarse directional contacts Uc—c—Dc; and (b) the control system's earlier mentioned coarse directional relays URc and DRc.

Positional errors of more than 38 mils that call for a raising of the gun move the indicator regulator's "up" segment Uc into engagement with coarse contact c (see Figs. 9-10). This engagement picks up the "up" coarse relay URc over a circuit shown in Fig. 9 as extending from the positive supply conductor 92 through conductor 234, the URc relay winding, regulator slip ring 94b, the coarse control contacts Uc—c, regulator slip ring 94a, contact HP1 of a control selector mechanism (see Fig. 12), transfer switch contact TS6, and breech interlock contact BI back to the negative supply conductor 93.

Thus energized relay URc opens its single back contact 204 and closes its four front contacts 235—236—237—238. Opening of a contact 204 breaks the pick up circuit for "down" field relay DR and thus renders that relay unresponsive to subsequent closure of the regulator's fine "lowering" contacts f—Df; closing of contact 235 establishes for "up" field relay UR a circuit through which that relay is held continuously picked up even though the regulator's fine "raising" contacts f—Uf may subsequently open; and closing of contacts 236—237—238 respectively establish for speed control relays f1R—f2R—f3R corresponding circuits through which those relays are held continuously picked up even though the regulator's speed setting contacts f1—f2—f3 may subsequently open.

The named hold up circuit for relay UR extends from transfer switch contact TS4 through conductor 201, URc's front contact 235, conductor 240, transfer switch contact TS6 and breech interlock contact BI back to the negative supply conductor 93; the corresponding hold up circuit for relay f1R extends from transfer switch contact TS1, through conductor 241, URc's front contact 236, conductor 240 and thence to negative conductor 93; the hold up circuit for relay f2R similarly includes transfer switch contact TS2, conductor 242 and URc's front contact 237; and the named hold up circuit for relay f3R extends from transfer switch contact TS3 through conductor 243, URc's front contact 238, conductor 240, transfer switch contact TS6 and breech interlock contact BI back to the negative supply conductor 93.

Result of foregoing is to keep relays UR—f1R—f2R—f3R continuously picked up as long as the error which calls for gun raising is large enough (over about 38 mils) to maintain the indicator regulator's "up" segment Uc in engagement with coarse contact c. Under this condition the positioning motor M is operated in the forward direction at its top gun raising speed of about 600 R. P. M.

Such operation continues until a reduction of positional error to less than about 38 mils disengages "up" segment Uc from coarse contact c. When that happens the control of motor M is restored to the indicator regulator's speed changing contacts f1—f2—f3 and fine directional contacts Uf—f. By them the motor speed is progressively decreased as the positional error is further reduced toward zero.

Positional errors of more than 38 mils that call for a lowering of the gun to effect correction move the indicator regulator's "down" segment Dc into engagement with coarse contact c. This engagement picks up the "down" coarse relay DRc over a circuit shown in Fig. 9 as extending from the positive supply conductor 92 through conductor 244, the DRc relay winding, regulator slip ring 94c, the coarse control contacts Dc—c, regulator slip ring 94a, selector mechanism contact HP1, transfer switch contact TS6, and breech interlock contact BI back to the negative supply conductor 93.

Thus energized relay DRc opens its single back contact 200 and closes its four front contacts 246—247—248—249. Opening of contact 200 breaks the pick up circuit for "up" field relay UR and thus renders that relay unresponsive to subsequent closure of the regulator's fine "raising" contacts f—Uf; closing of contact 246 establisher for "down" field relay DR a circuit through which that relay is held continuously picked up even though the regulator's fine "lowering" contacts f—Df may subsequently open; and closing of contacts 247—248—249 respectively establishes for speed control relays f1R—f2R—f3R corresponding circuits through which those relays are held continuously picked up even though the regulator's speed setting contacts f1—f2—f3 may subsequently open.

The named hold up circuit for relay DR extends from transfer switch contact TS5 through conductor 250, DRc's front contact 246, conductor 240, transfer switch contact TS6, and breech interlock contact BI back to the negative supply conductor 93; the hold up circuits for relays f1R—f2R—f3R are the same as earlier traced except that front contacts 247—248—249 of relay DRc take the place of relay URc's front contacts 236—237—238.

Result of foregoing is to keep relays DR—f1R—f2R—f3R continuously picked up as long as the error which calls for gun lowering is large enough (over about 38 mils) to maintain the indicator regulator's "down" segment Dc in engagement with coarse contact c. Under this condition the positioning motor M is operated in the reverse direction at its top gun lowering speed of about 600 R. P. M.

Such operation continues until a reduction of positional error to less than about 38 mils disengages "down" segment Dc from coarse contact c. When that happens the control of motor M is restored to the indicator regulator's speed changing contacts f1—f2—f3 and fine directional contacts Df—f. By them the motor speed is progressively decreased as the positional error is further reduced toward zero.

Positional errors in either direction of more than about 50 mils so greatly exceed the range of the indicator regulator's fine directional and speed changing contacts that normal response by those contacts is temporarily suspended. At the 50 mil error value, the point of the fine Selsyn repeaters large heart cam 142 has been advanced into engagement with cam roller 148 (see Figs. 11 and 14); further error increases up to 100 mils ride the roller down on the cam's other side and again into the notch; still further increases up to 150 mils again bring the heart cam's point into engagement with roller 148; and so on.

It has just been seen that large-error control of motor M is effected solely by the indicator regulator's coarse contacts Uc—c—Dc through relays URc—DRc. Hence any accumulated rotations (complete or partial) by the fine repeater's heart cam 142 (such as are described above) in no way interfere with the complete system's intended functioning. As, moreover, the positional error is reduced to within the 50 mil range earlier stated, this heart cam 142 automatically restores its normal relation to roller 148 and thereby again conditions itself for proper actuation of the fine contacts Uf—f—Df and f1—f2—f3.

In this way the motor control system accommodates itself to positional errors within a relatively wide range. The disclosed coarse contact linkage of which the coarse repeater's heart cam 190 forms a part is, in fact, capable of satisfactory response to errors of up to about 900 mils (45°) in either direction. By eliminating rigid mechanical connection between the repeater shaft 123 and the coarse contact assembly, cam 190 and roller 191 assure proper synchronous relation between the named shaft and the coarse directional contacts at all times.

*The limit switch and breech interlock*

Should the control system's data transmitter 102 of Fig. 8 call for a position of the gun which exceeds the gun's mechanical upper or lower limits, considerable damage might result in the absence of appropriate protection. In the organization here disclosed this protection is obtained from a limit switch shown generally at 252 in Fig. 4 and in greater detail by Fig. 20.

This switch includes: (a) a shaft 253 which by the aid of a pinion 254 mounted on the end thereof is mechanically geared to the gun's elevating rack 32 (see Fig. 5) in the manner shown by Fig. 4; (b) two groups of cams carried by that shaft and designated LU and LD in Fig. 20; and (c) two groups of contacts respectively operated by those cams and designated as LU1—2—3—4 and LD1—2—3—4 in each of Figs. 9 and 20.

All of those limit switch contacts are normally closed; those in the LU group open successively when the gun approaches its top limit of mechanical positioning movements; and those in the LD group open successively when the gun approaches its bottom limit of mechanical positioning movement. Representative elevations for such contact openings are set forth by Fig. 20. There the "plus" values designate mils of gun barrel elevation above the horizontal, and the "minus" values designate mils of gun barrel depression below the horizontal.

Assume that the control system calls for a high speed raising of the gun, and that such raising brings the gun close to its maximum limit of elevation. Under this condition Fig. 9's relays UR—f1R—f2R—f3R all will be picked up and motor M will be operating in the forward or gun raising direction at about 600 R. P. M.

As the gun barrel's muzzle reaches about 757 mils above the horizontal, transfer switch contact LU3 opens. From Fig. 9 it is seen that this opening breaks the by-pass circuit established by relay f3R's front contact 231 around generator field resistor R3. Result is to insert that resistor back into the energizing circuit for generator G's main control field winding 78. Such insertion reduces gun motor M's speed to about 270 R. P. M.

When the gun further reaches about 782 mils above horizontal, transfer switch contact LU2 also opens and breaks the by-pass circuit established by relay f2R's front contact 266 around generator field resistor R2. This further reduces positioning motor M's speed to about 120 R. P. M.

Additional raising of the gun barrel's muzzle to about 810 mils above horizontal further opens limit switch contact LU1, thereby breaking the by-pass circuit established by relay f1R's front contact 222 around generator field resistor R1 and/or the electronic controller 100. In consequence, motor M's speed now is further reduced to 40 R. P. M. or less.

Still further raising of the gun barrel to about 817 mils finally opens limit switch contact LU4. That opening breaks the energizing circuit for "up" field relay UR and by releasing that relay brings positioning motor M to a stop. Such stoppage occurs well before the gun can drift against the mechanical limit of its maximum upward travel.

Assume next that the control system calls for a high speed lowering of the gun, and by such lowering approaches the gun towards its maximum limit of depression. Under this condition Fig. 9's relays DR—f1R—f2R—f3R all will be picked up and motor M will be operating in the reverse or gun lowering direction at about 600 R. P. M.

As the gun barrel's muzzle reaches about 11 mils below the horizontal, transfer switch contact LD3 opens. From Fig. 9 it is seen that this opening breaks relay f3R's by-pass circuit around generator field resistor R3 and thereby reduces gun motor M's speed to about 270 R. P. M.

When the gun further reaches about 36 mils below horizontal, transfer switch contact LD2 also opens. This breaks relay f2R's by-pass circuit around field resistor R2 and further reduces positioning motor M's speed to about 120 R. P. M.

Additional lowering of the gun barrel's muzzle to about 64 mils below horizontal further opens limit switch contact LD1, thereby breaking relay f1R's by-pass circuit around resistor R1 (and/or electronic controller 100) and further reducing motor M's speed to 40 R. P. M. or less.

Still further lowering of the gun barrel to about 71 mils finally opens limit switch contact LD4, breaks the energizing circuit for "down" field relay DR, and by releasing that relay brings positioning motor M to a stop well before the gun can drift against the mechanical limit of its maximum downward travel.

An additional precaution against mechanical damage to the gun takes the form of a breech interlock contact shown at BI in each of Figs. 1, 9 and 21. This contact is occasioned by the fact that as the gun's breech is opened, the breech block (not shown in detail here) swings to the right on a suitable mounting at the barrel's rear.

If the gun were elevated from normal loading position after such breech opening, the breech block mechanism might be forced against the right side frame and seriously damaged. Further, it is desirable that some precaution be taken against accidental movement of the gun while a projectile is being rammed into the barrel. Accordingly the breech interlock contact BI is provided.

Fig. 21 shows that this contact is closed whenever the gun's breech is closed, and that each opening of the breech is accompanied by an opening of contact BI. Fig. 9 shows that such contact opening disconnects all of the indicator regulator's contacts Uf—f—Df, f1—f2—f3 and Uc—c—Dc from the control system's negative supply conductor 93.

Such disconnection effects a substantially complete shutdown of the system; it resulting in an immediate release of all of the system's relays UR—DR, f1R—f2R—f3R, and URc—DRc. Such release effectively prevents further operation on the part of gun positioning motor M and thereby safeguards the gun against mechanical damage when the breech block is withdrawn from the barrel.

*The elementary electronic controller of Fig. 8*

Under "automatic" operation of the motor control system corrective action is initiated when a positional error of about 0.3 mil first exists between the gun of Fig. 1 and the data transmitter 102 of Fig. 8. An error of this magnitude closes: (a) the indicator regulator's fine directional contacts Uf—f when a gun raising correction is called for; and (b) that regulator's fine contacts Df—f when a gun lowering correction is needed.

The lowest speed by gun positioning motor M for which the generator field resistors R1—R2—R3—R4 alone provide is of the general order of about 40 R. P. M. Such a speed changes the gun elevation at the rate of about 3 mils per second. Gun tracking speeds of a much lower value frequently are called for by the data transmitter 102 of Fig. 8, and in the absence of special means for providing them the gun would be moved in increments or steps of 0.3 mil to 0.5 mil even though continuous data were being received by the gun's indicator regulator 104. Since the elevation of the gun controls the range and since with continuous data available it is desirable to be able to fire at any moment, smoother operation is much to be preferred.

In the improved system of my invention provision for giving such smoother operation takes the form of the earlier mentioned electronic controller shown generally at 100 in each of Figs. 7–8–9 and in greater detail by the diagram of Fig. 22. When rendered active as shown in Fig. 9 this controller functions continuously and smoothly to change the output voltage of generator G and hence the speed of driving motor M in accordance with small but continuous changes in data received at the gun from the control room transmitter 102 (see Fig. 8).

Under the conditions which Fig. 9 represents, this controller 100 is series connected with resistors R2—R3—R4 in the circuit through which the exciter E supplies energizing current to the main control field winding 78 of generator G. That energizing circuit is shown as extending from the positive side of exciter E, through gun slip rings 99a, conductor 76, cut out switch contact CS1, conductor 92, resistor R4, the generator field winding 78, conductor 207, resistor R3, conductor 208, resistor R2, conductor 209, selector switch HP, transfer switch contact TS7, conductor 210, gun slip ring 99e, the controller 100 and conductor 211 back to the negative side of exciter E. Figs. 8 and 22 each show this excitation supply circuit in a simplified form which facilitates more ready analysis of the electronic controller's operation.

In the elementary showing of the electronic controller which Fig. 8 makes the just traced excitation supply circuit includes a three element power tube 257. The anode or plate 259 of this tube is connected with the positive side of exciter E through the generator field winding 78 (plus certain other circuit elements which Fig. 9 shows), and the tube's cathode or filament 260 is connected with the negative side of exciter E through conductor 211 (plus other circuit elements represented by Fig. 9). Electrons emitted by cathode 260 are attracted to the tube's positively charged anode 259 and thereby allow field winding current to flow through the tube.

Serving to determine the magnitude of this current is the tube's control grid 261. When this grid has the same potential as does cathode 260 the current passed from exciter E to field winding 78 will be exceedingly small; as the grid is made relatively more positive with respect to the cathode more electrons will be impelled toward anode 259 and the flow of current will increase; and as the positive potential applied to grid 261 is made greater the tube's passage of generator exciting current will become correspondingly larger.

Serving to supply this tube grid 261 with a control potential which varies with the positional error between the gun and its data transmitter are: (a) resistors 263—264—265 inserted as shown by Fig. 8 in the leads 120 by which the control room's fine transmitter's stator windings 112 are connected with the corresponding windings of the indicator regulator's fine repeater on the gun; (b) transformers 266—267—268 which amplify the voltage drops appearing across the just named resistors and which serve to insulate other portions of the electronic controller from those resistors; (c) rectifiers 269—270—271 which convert the alternating current outputs of the just named transformers into direct current voltages which appear across resistors 272—273—274; and (d) capacitors 275—276—277 which smooth the ripples from the rectified voltages appearing across the just named resistors and which apply the sum of these voltages between the grid 261 and the cathode 260 of the electronic tube.

By this application the tube's grid is made positive with respect to its cathode. In consequence, increases in the named summation voltage result in corresponding increases in the generator field winding current, and decreases in that grid voltage produce corresponding lowerings of generator G's excitation.

Contributing to the excitation governing action of electronic controller 100 is the indicator regulator's large heart cam 142 on the fine repeater's shaft 124. Under conditions of zero positional error the notch of this cam is aligned with roller 148 as shown in Figs. 8, 11 and 14; and the fine repeater's rotor 115 then is subjected to no resisting torque. Because of this balanced condition between transmitter and repeater the current flow through the Selsyn's stator supply conductors 120 is substantially zero and the grid voltage applied to electronic tube 257 then also is exceedingly small.

When, however, the fine repeater shaft 124 urges heart cam 142 in either direction with respect to gun position dial 131, the resulting engagement by fine contact f with one or the other of elements Uf—Df (see Fig. 14) restricts further relative movement of the repeater shaft. The resulting torque exerted against the fine repeater rotor 115 bears a direct relation to the positional error between the gun of Fig. 1 and its data transmitter 102 of Fig. 8. That torque, in turn, sets up in the windings 112 of the indicator regulator's fine repeater and in the transmitter conductors 120 leading thereto alternating currents of the transmitter system's supply frequency (60 cycles per second here).

In intensity those currents vary directly with the named torque and hence also with the motor control system's positional error. Thus, when that error is zero, the currents flowing through conductors 120 and resistors 263—264—265 are exceedingly small; when the error is about ½ mil those currents attain what will be spoken of as a medium value; and when the error increases to about 1 mil the currents build up to a correspondingly larger value.

Since the voltage drops across resistors 266—267—268 vary directly with the named currents, it follows: (a) that the control grid potential which is applied to the electronic tube 257 also is a direct function of the positional error; and (b) that the resulting current passed by the tube through generator G's main control field winding 78 is progressively increased as the error becomes larger.

In operation, therefore, an electronic controller organized in the basic manner just explained functions to govern the speed of gun positioning motor M in a way contributing to satisfactory tracking by the gun at relatively low rates of elevation change.

*The complete electronic controller of Fig. 22*

The complete electronic controller preferred for use in actual practice utilizes the expanded circuits and equipment of Fig. 22. There the field current controlling tube 257 of Fig. 8 is replaced by a pair of power tubes 257a—257b connected in parallel; the half wave rectifiers in Fig. 8's transformer output circuits are replaced by full wave rectifiers 269a—269b, 270a—270b, 271a—271b; Fig. 8's three output voltage storing capacitors 275—276—277 are replaced by a single capacitor 279 which has impressed thereon through a series resistor 280 the combined voltages of transformer resistors 272—273—274; an amplifier tube 281 is interposed between this capacitor 279 and the two power tubes 257a—257b by which the current through generator field winding 78 is determined; a synchronizing relay AH and amplifier input network of unique design are provided; and means which compensate for changes in the controller's supply voltage (from exciter E) also are included in the complete organization of Fig. 22.

As illustratively there shown, the energizing circuit for generator G's main control field winding 78 extends from the positive side of exciter E through conductor 92, resistor R4, front contact 95a of "up" relay UR (see Fig. 9) when picked up, the field winding 78, relay UR's front contact 96a when picked up, resistors R3 and R2 in series, resistors 282 and 283 in parallel, power tubes 257a and 257b (anode 259 to cathode 260) in parallel, conductor 284, the left portion of a resistor 285, a resistor 286, tap 287 and conductor 211 back to the negative side of exciter E.

Adjustment for a maximum current of about 85 milliamperes through this circuit preferably is effected at the named resistors 282—283. Such a current results in a speed by motor M of about 40 R. P. M. and in a gun tracking speed of approximately 3 mils per second. This limits the electronically controlled gun speed to about 3 mils per second maximum. Requirements above this value are by heart cam 142 (see Fig. 14) assigned to the indicator regulator's speed change contacts f1—f2—f3.

The represented inclusion of "up" relay UR's contacts 95a—96a in the above circuit typifies "forward" or gun raising operation by positioning motor M and flows current upwardly through Fig. 22's winding 78; under conditions of reverse or gun lowering operation by motor M, "down" relay DR's contacts 95b—96b (see Fig. 9) will similarly be included to produce a downward current flow through the field winding 78 as shown by Fig. 22.

Control grid potential for power tubes 257a—257b is determined by amplifier tube 281 in accordance with the positional error to be corrected. This potential is made up of: (a) a positive component derived from tap connections 291 and 301 with potentiometer resistors 293 and 285 across which voltage from exciter E is impressed; and (b) an error-proportional component of opposing or negative polarity derived from the terminals of a plate circuit resistor 290 through which the amplifier tube 281 passes current due to the voltage from exciter E that appears between potentiometer resistor taps 291 and 292. The represented path of this current flow extends from tap 291 (of relative positive potential) through the resistor 290, conductor 295, the anode and cathode elements 296—297 of amplifier tube 281, conductors 298—299, and a resistor 300 back to tap 292 (of relative negative potential).

The resultant voltage drop across resistor 290 subtracts from that appearing between potentiometer taps 291 and 301 and is applied through conductors 295 and 284 to the grid and cathode elements 261 and 260 of the controller's power tubes 257a—257b. Increases in the voltage appearing across resistor 290 thus make those grids relatively less positive with respect to those cathodes and thereby lower the current passed to the generator field winding 78; decreases in resistor 290's voltage similarly make grids 261 relatively more positive and thereby increase the generator excitation which the electronic controller provides. Grid resistors 328—329 limit the control potential that can be applied to power tubes 257a—257b should the input to amplifier tube 281 become excessive. These resistors thus prevent the power tube output from becoming undesirably high.

Control potential for the grid 303 of amplifier tube 281 is determined by the positional error currents that are present in the data transmission system's fine Selsyn conductors 120 (see Fig. 8). It has already been seen how these currents are converted into a summation voltage that is proportional to the error between Fig. 8's fine transmitter and repeater units. In the electronic controller of Fig. 22 this summation potential, as impressed across capacitor 279, is about 1½ volts when the positional error is zero; about 5 volts when the positional error is ½ mil; and about 10 volts when the error is 1 mil.

The named summation voltage thus is a measure of the system's "absolute error." As taken from resistors 272—273—274 the rectified components thereof are filtered a small amount by resistor 280 and capacitor 279 and then fed to resistors 304 and 307 in series. These resistors have such relative ohmage values that a considerable portion of the summation voltage appears across resistor 307 and the remainder across resistor 304.

The voltage component thus applied to resistor 304 is further smoothed by a bridging capacitor 308 and then impressed between the cathode and grid elements 297—303 of the amplifier tube 281. The tube control thus effected is of "absolute error" type in that the grid potential supplied from resistor 304 is directly proportional to and changes in unison with the error-produced summation voltage across capacitor 279.

This "absolute error" component makes the tube grid 303 negative with respect to the tube cathode 297. Increases thereof accordingly lower the current which tube 281 passes through its plate resistor 290 and by making the power tube grids 261 more positive (see earlier description of power tube grid supply circuit) cause tubes 257a—257b to pass more exciting current through generator G's field winding 78. Decreases in the "absolute error" component raise tube 281's plate current and resistor 290's voltage drop and by making the power tube grids 261 less positive cause tubes 257a—257b to pass less exciting current through the main control field winding 78.

By these actions the controller's power tubes 257a—257b are caused: (a) to pass substantially no current through generator G's field winding 78 under conditions of zero positional error between the gun of Fig. 1 and its data transmitter 102 of Fig. 8; (b) to excite winding 78 at low intensity when currents flowing through the fine Selsyn conductors 120 are the result of a small positional error; and (c) to supply winding 78 with progressively increasing values of exciting current as the positional error becomes larger.

*Anti-hunting provision*

This basic control of corrective action is modified by the error-determined voltage component which appears across resistor 307 in amplifier tube 281's grid potential supply network. That voltage is utilized to charge a capacitor 311 over a connection shown as including a companion resistor 309. As long as the system error is of a steady or unchanging value, capacitor 311 will be charged to the full voltage of resistor 307, no current will flow through resistor 309, and no voltage drop will appear across resistor 309.

In the event, however, of a change in system error, capacitor 311 will either draw a charging current through resistor 309 or pass a discharging current through resistor 309, depending upon whether the error increases or decreases. By each error increase the left end of resistor 309 will thus be made positive with respect to the right; by each error decrease the right end of resistor 309 will similarly be made positive with respect to the left.

In both instances the magnitude of resistor voltage drop will vary directly with the rate of error change. Resistor 309's voltage would therefore effect an "error change rate" form of control were it impressed directly upon amplifier tube 281. In the arrangement shown a portion of that voltage actually is so impressed through a connection wherein resistors 305 and 310 are included. This impression is effected by resistor 305 across which a part of resistor 309's "error change" voltage appears for direct introduction into tube 281's control grid circuit.

In the illustrative arrangement shown resistor 309's "error change" voltage also charges a capacitor 312 through the just mentioned resistor 305. Here the action is similar to that already discussed. As long as the voltage across "rate change" resistor 309 is zero or of a constant value no current will be drawn by capacitor 312 through resistor 305 and no voltage drop due to the capacitor will appear thereacross. Under this condition "absolute error" resistor 304 will supply amplifier tube 281 with all of its control grid voltage.

When, however, the rate of system error change varies, the resulting voltage across "rate change" resistor 309 causes capacitor 312 either to draw charging current through resistor 305 or to pass discharging current through resistor 305, depending upon the character of rate change variation. The resulting voltage drop across "error variation" resistor 305 combines with the "rate change" potential component supplied thereto as earlier explained. This combined voltage so modifies the "absolute error" potential from resistor 304 that amplifier tube 281 arrests each corrective action in time to prevent overshooting thereof.

Such arrest of corrective action is necessary because of the substantial inertia which the gun of Fig. 1 and its positioning motor M have. Were positioning power to be continued until all error were completely eliminated the energy of corrective motion would carry the gun past its desired position, require a reverse movement with possible attendant overtravel, and thereby set up undesirable oscillations above and below the desired elevation. The greater the speed of gun movement at the time of corrective power shutoff, moreover, the more intense would those oscillations be.

These factors are appropriately accounted for by the "error variation" component of control grid potential just described as appearing across resistor 305. It modifies the "absolute error" control voltage from resistor 304 in accordance with the speed at which the gun approaches the zero error position, and also in accordance with the rate at which that speed changes. If that speed is small the modification is small and advance cutoff of positioning power is proportionately slight; if that speed is large the modification and advance cutoff are proportionately greater. Result is overtravel elimination and avoidance of hunting.

Assume, for example, that the gun of Fig. 1 is being moved to some desired different elevation determined by a new but stationary setting of the control room's data transmitter 102. The existing positional error causes "absolute error" resistor 304 to impress upon amplifier tube 281 a negative grid voltage which is directly proportional to the error's magnitude and which through power tubes 257a—257b and generator field winding 78 causes motor M to move the gun towards the desired position at a speed that also is roughly proportional to the error's magnitude.

By reason of such movement the error will be decreased. This error decrease causes capacitor 311 to circulate through "error change" resistor 309 discharge current which makes the resistor's right end positive with respect to the left. The resulting "error decrease" potential thus set up in resistor 309 is introduced through resistors 310 and 305 into tube 281's grid control circuit where it opposes the "absolute error" voltage from resistor 304 and thus makes the tube grid 303 less negative. This cuts down the generator exciting current passed by power tubes 257a—257b and thus slows the speed of positioning motor M.

Further contributing to this slowing is such current through capacitor 312 as changes in resistor 309's voltage may occasion. Each such change circulates through "error variation" resistor 305 a capacitor current by which the resistor's terminal voltage is further modified in a way which so slows the corrective action as zero error position is approached that overshooting of that position is effectively prevented.

Assume next that the data transmitter setting is continuously advanced sufficiently ahead of the gun's position to call for an increase in corrective positioning rate. This error increase causes capacitor 311 to draw through "error change" resistor 309 a charging current which makes the resistor's left end positive with respect to the right.

The resulting "error increase" potential thus set up in resistor 309 is introduced through resistors 310 and 305 into tube 281's grid control circuit where it adds to the "absolute error" voltage from resistor 304 and thus makes the tube grid 303 more negative. This builds up the generator exciting current passed by power tubes 257a—257b and thereby increases the speed of positioning motor M. The desirability of such speed increase under the conditions stated is obvious.

Full anti-hunting control is found to require that the exciting current in generator field winding 78 at times be reduced completely to zero and then built up to a small value in the opposing direction. Electronic tubes acting alone are not readily capable of effecting such current reversal, and to provide same use is made of an auxiliary excitation supply circuit by which generator G's field winding 78 is at proper times supplied with small values of current of direction opposite to that which the electronic controller's power tubes 257a—257b provide.

As shown by Fig. 22, this auxiliary circuit extends from the positive side of exciter E through conductor 256, a resistor 289, relay contact 96a (or 96b, whichever is closed—see Fig. 9), the field winding 78, contact 95a (or 95b, whichever is closed), resistor 290, and conductor 228 back to the negative side of exciter E. The resistors 289 and 290 of this auxiliary circuit have relatively high ohmages (about 1000 and 5000 ohms respectively) and the maximum current passed thereby through field winding 78 thus is of the relatively low order of about 15 milliamperes.

Reference to Fig. 9 will show that in direction this current is opposite to that which the electronic controller 100 applies to winding 78; (a) when "up" relay UR's contacts 95a—96a are closed; and (b) also when "down" relay DR's contacts 95b—96b are closed. In the event, therefore, that the current passed by the controller's power tubes 257a—257b is reduced completely to zero, the named opposing current will be present in the generator field winding; when power tubes 257a—257b pass a like intensity of normal direction current then the net current in field winding 78 will be zero; and when the controller's tubes pass greater amounts of normal direction current same will be available for exciting generator G in the particular direction which relay UR or DR (see Fig. 9) has established.

The auxiliary field winding circuit just described forms part of a "Wheatstone bridge" organization wherein resistors R4 and 289 constitute one pair of legs connected with exciter E's positive terminal, resistor 290 and power tubes 257a—257b the other pair of legs connected with exciter E's negative terminal, and the field winding 78 is energized by such unbalance potential between element junction points of the two leg pairs as current-carrying adjustment of the power tubes effects.

By this auxiliary circuit the electronic controller is at proper times able to bring generator G's exciting current completely to zero and to such value in the opposing direction as may be needed to arrest corrective action overtravel as the desired gun position is reached.

*The compensating capacitor and synchronizing relay*

The electronic controller of Fig. 22 includes provision whereby certain changes in operating conditions are prevented from altering either the calibration or the performance of the controller. Utilized for this purpose are: (a) a capacitor 315 series connected as shown in amplifier tube 281's grid potential supply circuit; (b) a uniquely organized source of charging voltage of that capacitor; and (c) the earlier mentioned relay AH which at proper times by-passes the capacitor over a back contact 314.

Pick up by relay AH occurs only when positioning motor M is being supplied with driving current as a result of pick up either by "up" field relay UR or by "down" field relay DR. The winding of relay AH then receives energizing current over one or the other of front contacts 206 and 215 of relays UR and DR. As illustratively shown by Fig. 9 the pick up circuit extends from positive control conductor 92 through gun slip ring 99h, the AH relay winding, gun slip ring 99i, conductor 356, front contact 306 of relay UR (or front contact 215 of relay DR) and conductor 357 back to the negative supply conductor 93.

When so picked up relay AH opens contact 314 and thereby inserts capacitor 315 into amplifier tube 281's grid supply circuit. Such insertion takes place upon each initiation of corrective operation of gun positioning motor M and continues for the duration of that operation. Upon release of the active motor control relay UR or DR at the completion of each correction, relay AH becomes de-energized (see Fig. 9) and by reclosing back contact 314 again by-passes capacitor 315.

During each operation by motor M and the described pick-up by relay AH, capacitor 315 is charged by the voltage appearing between taps 360 and 361 on potentiometer resistors 300 and 322 connected as shown between the terminals of the controller's supply exciter E. The charging current path represented by Fig. 22 extends from tap 360 (of relative positive potential) through conductors 299—298, the capacitor 315, conductor 354, a resistor 317, and conductor 355 back to tap 361 (of relative negative potential).

The voltage thus impressed upon capacitor 315 reflects changes in certain factors to be compensated for, and by making the capacitor's lower terminal positive with respect to the upper it directly adds to the "absolute error" voltage from network resistor 304 in making the amplifier tube's grid 303 negative with respect to the cathode 297. Effect is, therefore, to raise the output of power tubes 257a—257b over and above the "absolute error" level.

The benefits of such a raising will be described presently. Although desirable once operation of the gun positioning motor M has gotten under way, experience shows that introduction at the instant of motor starting may produce a corrective action so strong that arrest thereof by the earlier described anti-hunting network may not always be possible.

The synchronizing relay AH functions to overcome this difficulty. By short circuiting capacitor 315 at the end of each corrective action it assures a discharged condition thereof at the beginning of the next. The intensity with which each corrective action is initiated thus is determined only by the "positional error" potential which network resistors 304 and 305 apply to amplifier tube 281.

Subsequent build up in capacitor 315 of compensating voltage can be made to take place at a rate sufficiently slow to prevent corrective action overtravel or an introduction of positioning oscillations due to positive feed back. Adjustment of this rate may be made at resistor 317 in the capacitor's charging circuit. In practice, a time constant of about 0.8 second is found to be adequate for capacitor 315 and resistor 317.

By thus serving as a response cushioner, synchronizing relay AH assists in keeping corrective movements by motor M within required change range limits. This contributes to a prompt synchronization of the gun with each new firing position which the control transmitter 102 selects.

*Factors compensated for*

Capacitor 315's charging circuit is designed to provide electronic controller compensation for changes in: (a) the voltage of exciter E within the approximate limits of from 125 to 135 volts; (b) changes in the output current of the controller's power tubes 257a—257b; and (c) differences in the current drawn by tube cathode heaters 319—320—321 between cold and hot conditions of the electronic tubes and other controller parts.

All of these factors combine to determine the total voltage that appears between potentiometer taps 360 and 361 and by which the compensating capacitor 315 is charged during each tube controlled operation of the gun positioning motor M.

This voltage is derived from the several potentiometer resistor circuits which Fig. 22 shows directly above the exciter E and as being energized by the voltage of that exciter. The uppermost of these circuits includes the tube cathode heaters 319—320—321 plus resistors 293, 285, 286; the next lower circuit also includes cathode heaters 319—320—321 but is completed through conductor 363 and a resistor 322; and the circuits therebeneath utilize a voltage regulator tube 326 connected with resistor 286's tap 292 through resistors 300 and 327 and with the exciter terminals through the tap 364 of a potentiometer resistor 325.

The current through each of the upper two circuits just described is determined by the cathode heater resistance. When the electronic controller is cold this resistance is lower and the heater current for a given exciter voltage is greater than when the controller is hot. Such current variation is directly present in resistors 293, 285, 286 and 322.

The current through resistors 285—286 in the upper circuit further varies in accordance with the output of power tubes 257a—257b. This follows from the fact that all current passed by those tubes through the generator field winding 78 returns to the negative side of exciter E through resistors 285—286.

Voltage regulator tube 326 is of a well known gas filled "glow" type which when energized provides an internal drop of about 75 volts and holds this drop substantially constant even though the voltage applied thereto may change. In the circuit shown substantially all variations in the voltage of exciter E are by this tube caused to appear across resistors 327 and 300 where they are considerably magnified. In percentage this voltage change at the named resistors is about three times as much as at the exciter terminals.

From Fig. 22 it will be seen that capacitor 315's charging potential is made up of: (a) the voltage drop through "exciter voltage change" resistor 300 to the left of tap 360; plus (b) the voltage drop through "heater plus power tube current" resistor 286 to the left of tap 292; minus (c) the voltage drop through "heater current only" resistor 322 to the left of tap 361.

It is desired that the electronic controller perform the same when cold as when after heated up, even though the cathode heaters 319—320—321 draw considerably more current under the cold condition than under the hot. Such current variation does not substantially alter performance by the individual tubes 281, 257a—257b. Since, however, the named heaters have a high temperature coefficient of resistance it does materially change the current through resistors 293, 285, 286.

Operating experience shows that in the illustrative circuits of Fig. 22 all undesirable effects of such change can be eliminated by causing the heater current drop through resistor 286 to the left of tap 292 to substantially equal and hence cancel the heater current drop through resistor 322 to the left of tap 361. Adjustment necessary for this result preferably is made at tap 361 under conditions of zero output by power tubes 257a—257b.

The named condition of complete neutralization may, however, be slightly altered without objectionable effect. As later set forth, such slight alteration actually is made at tap 361 to select the optimum error for the system.

It is further desired that changes in the voltage of exciter E have no altering effect upon the electronic controller's performance. Such changes act in opposite directions on the plate circuits of amplifier tube 281 and of power tubes 257a—257b. In latter case voltage increases tend to raise the power tube output current; in the former voltage increases also tend to increase the amplifier tube plate current, but since this raises the voltage drop through resistor 290 the power tube output is thereby lowered. In the amplifier shown such lowering more than overcomes the first named tendency.

Net result therefore is that increases in the voltage of exciter E lower the power tube output current while decreases in exciter voltage raise it. Compensation accordingly requires that each increase of exciter voltage produce a higher charge on the amplifier grid circuit's capacitor 315, and that each voltage decrease effect a lowering of that charge. This follows from an earlier observation that in amplifier tube 281's grid circuit the capacitor voltage acts to raise the output of power tubes 257a—257b over and above their "absolute error" level.

Capacitor charging voltage suitable for accomplishing the above is provided by resistor 300. As has been seen regulator tube 326 causes this resistor voltage to change more rapidly than does the exciter voltage, the illustrative ratio being of the order of about 3 to 1. For the electronic controller shown such a ratio is found necessary in order to make the output of the controller independent of changes in exciter voltage within normal operating range, such as from 125 to 135 volts.

Adjustment of resistor 300's tap 360 can best be made by trial. Holding the "absolute error" voltage across resistor 304 constant, proper adjustment is had when the generator exciting current passed by power tubes 257a—257b shows no variation upon exciter voltage changes through the 125 to 135 volt range stated.

Controller load compounding

It is still further desired that changes in the output current of the power tubes 257a—257b shall not alter the "absolute error" voltage which network resistor 304 must impress upon the grid of amplifier tube 281 in order to maintain the system's positional error at a specified value, such as 0.4 mil. Such an objective is occasioned by tracking.

Without it high tracking speeds of the gun will call for higher "absolute error" voltages at resistor 304 than will low tracking speeds. Thus, a tracking speed of ½ mil per second might require only 2 volts at resistor 304; a 1 mill per second speed might call for 4 volts; a 2 mill speed might require 8 volts; and a 3 mil per second speed of the gun might require 12 volts at resistor 304 in order to effect its production.

Such a proportional relation results from the fact the speed of gun positioning motor M is determined by the amount of exciting current with which generator G's field winding 78 is supplied. High motor speeds thus impose a higher current load on power tubes 257a—257b than do low motor speeds. That imposition, in turn, requires that the error voltage impressed upon the grid of amplifier tube 281 be raised in a proportional manner (see preceding paragraph) as the gun's tracking speed is increased.

This limits correction of the system error to a value which increases directly with the tracking speed. In gun positioning applications of the type here considered such limitation is undesirable. Superior performance is possible if the system error be made relatively independent of the tracking speed and the power tube current required to produce same. In that event a selected constant value of error can automatically be held throughout the electronic controller's entire tracking speed range.

In the electronic controller circuits of Fig. 22 this desired objective is achieved through a unique "compounding" arrangement by which each increase in the output current of power tubes 257a—257b is caused so to intensify amplifier 281's grid control voltage as to be self-supporting. Such intensification is produced by the charging voltage which resistor 286 supplies to the amplifier tube's grid circuit capacitor 315.

It has been seen that the voltage drop through this resistor 286 varies in accordance with the current which the power tubes 257a—257b pass through the field winding 78. Increases in that current accordingly build up the charge on capacitor 315 and thereby "compound" the electronic controller in the manner desired. Adjustment in this compounding may be effected at resistor 286's tap 287.

By such adjustment a wide variety of effects may be produced. These vary from: (a) the proportional error-to-output relation obtained as earlier described without any compounding; through (b) the desired relation wherein the holdable error stays at a constant value throughout the controller's entire range of power tube output and gun tracking speed control; and to (c) an overcompounded relation wherein increases in power tube output actually lower the error voltage that is needed from network resistor 304 to maintain the required tracking speed.

Movement of tap 287 to the left on resistor 286 advances the "compounding" setting from the foregoing paragraph's condition (a) toward condition (c); movement in the opposite direction reduces the portion of resistor 286 from which compounding voltage is taken and thereby adjusts in the direction of from condition (c) toward condition (a).

Experience shows that adjustment (b) gives the best results in actual practice. This adjustment is made by holding the error voltage across resistor 304 at a constant value corresponding to the system's selected operating error (such as 0.4 mil) and then so locating tap 287 that power tubes 257a—257b will of their own accord gradually increase field winding 78's current from some low value, such as 20 milliamperes, to some considerably higher value, such as 60 milliamperes.

The mentioned operating error selection is made at resistor 286's second tap 292; also some adjustment at resistor 322's tap 361 may be made for the purpose named. In the complete gun positioning system here disclosed an error value of about 0.4 mil is preferred. This is slightly above the 0.3 mil error needed to close the indicator regulator's fine directional contacts f—Uf or f—Df. Other values of operating error are, of course, useable.

It is obvious that resistor 325 in connection with capacitor 315 serves as a positive feed back from the output to the input of the amplifier; and that if precautions were not taken objectionable oscillations would be set up. Therefore, resistor 317 is used to provide sufficient time lag in this feed back to prevent such oscillations. As earlier stated, the time constant for this resistor-capacitor combination may satisfactorily be about 0.8 second.

*System operation under automatic control*

The manner in which the complete system operates will have become more or less apparent from the foregoing description of the component devices and circuits of which the system is constituted.

Assume, first, that the control transmitter 102 (see Fig. 8) is supplying to the indicator regulator 104 on the gun continuous data which calls for a slow "tracking" movement of the gun in the upward direction. Under this condition fine directional contacts f—Uf are closed, "up" field relay UR (see Fig. 9) is picked up and the gun positioning motor M is being operated at a slow speed determined by the electronic controller 100.

The magnitude of this speed is determined by the positional lag between the fine transmitter and the fine repeater Selsyns. That lag, in turn, is translated from currents in transmitter conductors 120 into a value of generator field excitation which causes motor M to elevate the gun at the particular speed for which the data transmitter calls. As has been seen, only a very low positional lag is needed to maintain this uniform tracking.

Assume next that the data transmitter calls for a sudden and relatively large increase in elevation. This creates a correspondingly large displacement between fine Selsyn rotors 107 and 115 and through large heart cam 142 (see Fig. 14) causes further closure by speed contacts f1—f2—f3. In consequence motor M's speed is successively raised through the settings of 120—270—600 R. P. M. and elevation of the gun then proceeds at the maximum rate of about 213 mils per second.

Should the total error exceed about 38 mils the indicator regulator's coarse contacts c—Uc then further close, pick up coarse control relay URc, and while maintaining the maximum gun positioning speed take all of the indicator regulator's fine contacts out of action until the error is reduced to below 38 mils.

When that happens relay URc is released and control of the motor is again restored to fine contacts f3—f2—f1 and f—Uf. Continued reduction of the error successively opens contacts f3—f2—f1 to progressively reduce the motor speed. Upon complete elimination of error contacts f—Uf open and bring motor M to a stop.

Positional changes by the gun in the lowering or depressing direction for which data transmitter 102 calls result in sequences of action so closely similar to those just described that detailed repetition is not deemed necessary. Only essential difference is that fine contacts f—Df and coarse contacts c—Dc plus relays DR—DRc are now used.

In the above manner the disclosed system and apparatus for positioning movable objects functions at all times to provide quick and accurate response by the positioning motor M to control indicator changes in either direction and at widely varying rates.

*Manual control of gun positioning power*

At times it may be desirable to replace the foregoing full automatic operation by a manual or semi-automatic control of the gun positioning power. To prepare for such replacement a selector lever 331 (see Figs. 2 and 12) on the indicator regulator's right side is shifted from its represented upward or "auto" position downwardly into a "hand" position.

By this shift: (a) a cone shown at 332 in Figs. 11-12 is by a yoke 330 pushed into a clutch assembly 333 to transfer the driving connection for large heart cam 142 from the fine Selsyn repeater's rotor shaft 124 to the elevating mechanism's manually operable handwheels 44—45 (see Fig. 4); and (b) two electrical contacts HP and HP1 are moved downwardly to substitute Fig. 9's generator field resistor R1 for the electronic controller 100 and to take the coarse motor control relays URc and DRc both out of action.

The just named new driving connection for the large heart cam 142 is shown in Figs. 4, 11-12 as extending from the handwheels 44—45 through shaft 51, bevel gears 52 and 334, a small pinion 335 protruding through the top of Fig. 4's gear box, spur gears 336—337 (see Fig. 12) in the indicator regulator of Fig. 2, bevel gears 338—339, shaft 340, spur gears 341—342—343—344, a shaft 345 rotatably connected with gear 344 but free to move axially with respect thereto, the cone 332 fixed to the end of that shaft, clutch rollers 346—347 engaged by cone 332 when pushed therebetween by movement of selector lever 331 to the "hand" position, and a rotative driving connection (see Fig. 11) between the clutch assembly 333 and the large heart cam.

The named "hand" positioning of cone 332 expands the clutch rollers 346—347 radially and thereby lifts an earlier mentioned roller 151 (see Figs. 11–12) out of engagement with the small heart cam 152 on the indicator regulator's fine Selsyn shaft 124. This action completely disconnects the large heart cam 142 from the fine repeater Selsyn shaft 124. At the same time clutch rollers 346—347 are so firmly held under spring pressure against cone 332 that a new driving connection is established therethrough from the cone to the clutch.

By reason of this new connection all turnings of handwheels 44—45 are directly transmitted to the large heart cam 142. Through the medium of such transmission movements imparted to the handwheels may be converted into responses by the indicator regulator's fine directional contacts U$f$—$f$—D$f$ and speed changing contacts $f1$—$f2$—$f3$.

In the motor control circuits of Fig. 9, meanwhile, each of contacts HP and HP1 has been moved to its lower or "hand" position. Under this condition contact HP removes electronic controller 100 from generator field winding 78's excitation supply circuit and inserts field resistor R1 into that circuit. Because of this substitution, each initial closure of the indicator regulator's fine directional contacts $f$—U$f$ or $f$—D$f$ causes motor M to rotate at a fixed slow speed of less than 40 R. P. M.

In its lower or "hand" position, selector contact HP1 disconnects the indicator regulator's coarse directional contacts U$c$—$c$—D$c$ from the negative supply conductor 93 and thereby prevents coarse control relays UR$c$ and DR$c$ from being brought into action while the indicator regulator's selector lever is in its lower or "hand" control position.

Fig. 4's handwheels 44—45 now are effective either to elevate or to depress the gun entirely at the will of an operator and independently of the data transmitter 102 in the remotely situated control room. Indicator regulator's dials 116—117 continue to repeat the positions of the control room's transmitter dials 108—109, but by reason of the mechanical and electrical disconnections earlier stated motor M's control facilities are in no way affected thereby.

Hence, "forward" turning of the handwheels 44—45 acts through large heart cam 142 to close fine directional contacts $f$—U$f$, to pick up "up" field relay UR, and thereby to start motor M in the gun raising direction at a fixed slow speed (within the 40 R. P. M. range) determined by generator field resistor R1. If the resulting change in gun elevation is not fast enough to keep pace with the handwheel movement, then the consequent lag will through heart cam 142 close the first speed contact $f1$ and thereby increase motor M's speed to about 120 R. P. M.; further accumulated lags will successively close speed contacts $f2$ and $f3$ and thereby bring about the still higher motor speeds of 270 and 600 R. P. M.

Upon stoppage of forward handwheel turning the motor will continue to elevate the gun until all positional lag has been eliminated. Upon reduction of this lag to about 35 mils, contact $f3$ opens and reduces the motor speed to about 270 R. P. M.; further error reduction to about 15 mils further opens contact $f2$ and restores the motor speed to about 120 R. P. M.; still further reduction to about 5 mils opens contact $f1$ and brings the motor speed down to less than 40 R. P. M.; and complete elimination of the lag opens contacts $f$—U$f$ and by releasing relay UR brings the motor to a stop.

A "reverse" turning of the handwheels acts in a similar manner to close fine directional contacts $f$—D$f$, pick up "down" field relay DR and thereby start motor M in the gun lowering direction. If the initial slow speed depression of the gun is not fast enough to keep pace with the handwheel movement, speed contacts $f1$—$f2$—$f3$ may again be closed in succession to provide increased motor speeds of 120–270–600 R. P. M.

Stoppage of reverse handwheel turning causes the gun lowering speed of motor M progressively to be lowered as the positional lag is reduced. Upon attainment of zero lag contacts $f$—D$f$ open and bring the motor to a stop.

Under this semi-automatic control of the positioning motor M the operator on the crew platform 27 can observe the incoming data on the indicator regulator dials 116—117 and by moving the handwheels 44—45 cause the gun dial pointers 130—131 to match those incoming data dials. In this type of operation, wherein the handwheels control all of the "fine" cam-linked contacts in the regulator, the gun thus is power driven by motor M but under direct control of the operator.

To restore the gun positioning system to full automatic control by the data transmitter 102 of Fig. 8, it is only necessary to shift the indicator regulator's selector lever 331 back to the upper or "auto" position of Fig. 12. Such a shift withdraws cone 332 from between clutch rollers 346—347 and thus breaks the mechanical connection between handwheels 44—45 and the large heart cam 142; it also allows roller 151 under urging of the scissors spring 150 to reseat itself in the notch of small heart cam 151 on the indicator regulator's fine Selsyn shaft 124.

That reseating restores the original driving connection between Selsyn shaft 124 and the large heart cam 142, and thereby reconditions the system for the automatic operation earlier described. Even though the clutch 333 and the small heart cam 152 may be at positional variance when the cone 332 is withdrawn, spring 150's inwardly acting pressure against roller 151 rides the clutch around into register with that cam's notch and thereby always brings large heart cam 142 into exact positional agreement with the indicator regulator's fine Selsyn shaft 124.

Further results of returning selector lever 331 to its "auto" position are: (a) to remove at contact HP1 field resistor R1 from generator G's excitation supply circuit and reconnect (see Fig. 9) the electronic controller 100 therein; and (b) to reconnect at contact HP1 the coarse directional contacts U$c$—$c$—D$c$ with the negative supply conductor 93 and thereby recondition coarse control relays UR$c$—DR$c$ for response to closure by those contacts.

*The transfer and loading position switches*

Large caliber guns of the illustrative type which Fig. 1 shows utilize projectiles 26 that are relatively heavy; typically, moreover, the ammunition of which such projectiles form a part is of the separate loading type and requires that the projectile, propelling charge, and igniter for each round be placed in the gun individually. These and other factors combine to make it necessary that the gun's barrel 25 be lowered to a near horizontal position, such as about 178 mils, each time it is reloaded.

The extremely heavy weight of the Fig. 1 gun plus the advantage of reducing the reloading and reaiming time to a minimum makes desirable a provision of some automatic means for elevating the gun, returning it to the loading position, restoring it to the proper firing elevation and maintaining it at the proper firing elevation setting at all times.

The improved system here disclosed includes such provision in the form of: (a) a loading position switch mounted on the gun carriage as shown at 349 in Fig. 1 and including the contacts which Fig. 19 represents; and (b) a transfer switch mounted on the gun carriage's left side (not shown in Fig. 1) and being of the type which Figs. 17–18 represent. Included in the schematic circuit diagram of Fig. 9 are the seven transfer switch contacts designated "TS," plus the eight loading position switch contacts designated "LP."

Purpose of the loading position switch LP (Fig. 19) is so to control motor M that the gun will automatically be brought to its loading position, illustratively here considered as being about 178 mils above the horizontal, from any point in its entire elevation range; purpose of the transfer switch TS (Figs. 17–18) is upon a need for such action to take motor M's control away from the indicator regulator's contacts (U$f$—$f$—D$f$, $f$1—$f$2—$f$3, Uc—c—Dc) and place it with the loading position switch, also following gun loading to restore the motor control to the indicator regulator for automatic return of the gun to the firing position which data transmitter 102 determines.

All seven contacts of the transfer switch always occupy either one or the other of the two positions which Figs. 17–18 designate as "auto" and "load." Movement from one to the other of these positions is effected manually by an operator on the gun platform.

In the former or "auto" position these TS contacts are as indicated by Fig. 18 and by establishing the several electrical connections which the diagram of Fig. 9 shows they then condition the motor control system for the earlier described automatic response to indicator regulator contact operation initiated by data transmitter 102; in the latter or "load" position these same TS contacts are at their upward limits of travel (see Figs. 18 and 9) and reference to Fig. 9 will show that they then include the loading position switch contacts LP in the pick up circuits for "up" and "down" field relays UR and DR and for speed control relays $f$1R—$f$2R—$f$3R.

As shown in Fig. 19 the loading position switch includes: (a) a shaft 350 which by the aid of a pinion 351 mounted on the end thereof is mechanically geared through a bevel gear sector 352 to the gun's trunnion for rotation in exact synchronism with all changes in gun elevation; (b) two groups of cams carried by that shaft and designated LPU and LPD in Fig. 19; and (c) two groups of contacts respectively operated by those cams and designated as LPU1—2—3—4 and LPD1—2—3—4 in each of Figs. 9 and 19.

At gun elevations below 117 mils all of those "up" switch contacts LPU are closed and all "down" contacts LPD are open; at gun elevations above 237 mils all "down" contacts LPD are closed and all "up" contacts LPU are open; and when the gun elevation is between 175 and 180 mils (at the loading position illustratively assumed to be about 178 mils) all contacts in both groups are open, as Figs. 9 and 19 both show.

As the gun is raised from below 117 mils toward the 178 mil loading position the "up" switch contacts successively open in the order of LPU3—LPU2—LPU1—LPU4 when elevations of 117 — 142 — 168 — 175 mils are respectively reached; and as the gun is lowered from above 237 mils toward the 178 mil loading position the "down" switch contacts successively open in the order of LPD3—LPD2—LPD1—LPD4 when elevations of 237—212—186—180 mils are respectively reached.

*Operations incident to gun loading*

Starting with the motor control system in the "automatic" operating condition which Fig. 9 represents, assume that the transfer switch of Figs. 17–18 is thrown to the "load" position. Transfer contact TS1 connects the winding of relay $f$1R with the negative supply conductor 93 through loading switch contacts LPU1—LPD1 in parallel; transfer contact TS2 assigns relay $f$2R's pick up circuit to loading contacts LPU2—LPD2; transfer contact TS3 assigns the control of relay $f$3R to loading contacts LPU3—LPD3; transfer contact TS4 assigns "up" field relay UR's pick up circuit to loading contact LPU4; transfer contact TS5 assigns control of "down" field relay DR to loading contact LPD4; transfer contact TS6 disconnects the pick up circuits of coarse control relays URc—DRc from the negative supply conductor 93 and thereby renders those relays inactive; and transfer contact TS7 removes the electronic controller 100 from generator G's excitation supply circuit and connects field resistor R1 therein.

If the gun is at an elevation below 117 mils when this "load" positioning of the transfer switch occurs, the following actions will take place. Relays UR—$f$1R—$f$2R—$f$3R will all immediately pick up and apply maximum "forward" excitation to generator G's main control field winding 78; gun motor M will in consequence be started and brought at maximum acceleration up to its high forward speed of 600 R. P. M.; and the gun will thereby be raised at its maximum rate of about 213 mils per second.

When the gun reaches 117 mils contact LPU3 opens and by deenergizing relay $f$3R (contact LPD3 is already open) reduces the motor speed to 270 R. P. M.; when the gun further advances to 142 mils contact LPU2 further opens to release relay $f$2R and thereby further reduce the motor speed to 120 R. P. M.; when the gun reaches 168 mils elevation contact LPU1 also opens and by releasing relay $f$1R brings the motor speed down to less than 40 R. P. M.; and finally when the gun reaches 175 mils contact LPU4 likewise opens to release "up" field relay UR and thereby bring motor M to a stop.

In this way the gun is automatically brought from a low elevation upwardly to the loading position of about 178 mils. Should the gun be within the range of from 117 to 175 mils when the transfer switch is thrown to "load," an initial motor speed appropriate to the starting position will be selected. From that point the gun will be brought to the 178 mils loading position in the manner just explained.

If the gun is at an elevation above 237 mils when the transfer switch is first thrown to "load," relays DR—$f$1R—$f$2R—$f$3R will all immediately pick up and apply "reverse" excitation to generator G's main control field winding 78; gun motor M will in consequence be started and brought at maximum acceleration up to its high reverse speed of 600 R. P. M.; and the gun will thereby be lowered at its maximum rate of about 213 mils per second.

When the gun has in this manner been depressed to 237 mils, contact LPD3 opens and by de-energizing relay f3R (contact LPU3 is already open) reduces the motor speed to 270 R. P. M.; when the gun further reaches 212 mils contact LPD2 also opens to release relay f2R and thereby further reduce the motor speed to 120 R. P. M.; when the gun is further lowered to 186 mils contact LPD1 further opens and by releasing relay f1R brings the motor speed down to less than 40 R. P. M.; and finally when the gun reaches 180 mils contact LPD4 likewise opens to release "down" field relay DR and thereby bring motor M to a stop.

In this way the gun is automatically brought from a high elevation downwardly to the loading position of about 178 mils. Should the gun be within the range of from 237 to 180 mils when the transfer switch is thrown to "load," an initial motor speed appropriate to the starting position will be selected. From that point the gun will be brought to the 178 mill loading position in the manner just explained.

Restoration of the transfer switch to the "auto" position returns the motor control system to the automatic operating condition which Fig. 9 illustrates. All of the system's relays again being under control of the indicator regulator's contacts, the gun is by those contacts automatically returned to the firing position which the data transmitter 102 of Fig. 8 determines. All actions incident to such return have earlier been explained in detail.

The automatic loading position circuits here shown are, moreover, so arranged that once the transfer switch has been thrown to "load," an opening of the breech and its interlock contact BI does not cut off the power to the driving motor M until the gun has actually reached the loading position.

By the transfer and loading position facilities just described the rate of firing by the controlled gun is considerably increased. This results from a substantial decrease in average "dead" time in automatically taking the gun from firing to loading elevation and returning it to firing elevation. For a heavy caliber weapon of the type here shown this saving in dead time is in actual practice demonstrated to be approximately 2 seconds.

Summary

As here disclosed my improved electrical system and apparatus is used to position a seacoast gun in elevation. It will be obvious, however, that this use is illustrative rather than restrictive.

With but minor modifications substantially the same equipment may also be utilized to position the represented gun in azimuth or in traverse, and also either to elevate or to traverse lighter firearms and other movable objects. The disclosed system thus is usable in a wide variety of applications wherein electrical positioning power is to be controlled either remotely or locally.

As compared with oil gear and other hydraulic systems used in the past for positioning seacoast and other firearms, my improved "all electric" system is found to offer significant advantages. One highly practical feature is the described provision for automatically laying the gun at the loading position or the firing position by means of the transfer switch.

Elimination of hydraulic devices also contributes to the simplicity of maintenance. My "all electric" positioning equipment requires normal care and upkeep only. All elements, including the indicator regulator and the electronic controller, are both durable and reliable and may readily be serviced.

The disclosed system has an inherently high accuracy, and for gun positioning applications of the type here shown its average error is in actual practice found to be as small as and usually smaller than can be obtained with manual pointer matching. This system provides accurate tracking of the positioned gun in response to control indicator changes in either direction and at widely varying rates. By reason of the electronic controller exceedingly smooth operation is obtained and synchronizing is very satisfactory. At all tracking rates of from 0 to 3 mils per second this controller keeps the maximum error at less than 0.5 mil. The indicator regulator's contacts adequately provide for all higher rates of gun position change. In cases where continuous tracking may not be necessary satisfactory functioning without the electronic controller is, moreover, possible.

The improved electrical positioning apparatus here disclosed is further characterized by an immunity to severe jars such as are incident to gunfire. Contributing to this immunity is the unique relay armature design shown by Fig. 15. The proportioning and mounting of this and all other gun carriage elements is such that severe mechanical shocks cannot affect their operation adversely.

It will accordingly be seen that I have improved the design and extended the usefulness of positioning systems wherein all movements of the controlled object are effected by an electric motor and without the aid of hydraulic devices of any kind; that I have provided an "all electric" positioning system which is quick and accurate in its response, positive and reliable in its operation, and simple and economical in its maintenance; that I have made available for seacoast and other heavy caliber guns an electrical positioning system which decreases the "dead" time incident to gun loading and thereby increases the attainable firing rate; that I have made possible smooth and accurate tracking of the positioned gun in response to control indicator changes in either direction and at widely varying rates; that I have provided control apparatus that is not affected adversely by severe jars such as are incident to gunfire; and that I have provided a highly practical gun positioning system that is controllable either automatically or manually.

My inventive improvements are therefore extensive in their adaption and are not to be restricted to the specific form here disclosed by way of illustration.

I claim:

1. In a positioning system, the combination of an object to be positioned, an electric motor for imparting positioning movement to said object, means including a control winding for determining the direction and the speed of said motor's rotation, a control indicator mechanically settable to any position that is desired for said object, an object indicator which at all times registers the object's actual position, fine directional contacts actuated by said control and object indicators and responding to small positional variances therebetween, speed change contacts also actuated by said control and object indicators and successively responding to predeterminedly larger values of positional variance therebetween, coarse directional contacts likewise actuated by said control and object indicators but responding only to still larger positional variances therebetween, an energizing source for said motor control winding, master directional relays effective upon each response by said fine directional contacts for connecting said control winding with said source in a way which causes said motor to move said object at slow speed toward positional coincidence with said control indicator, winding current adjusting relays effective upon response by said speed change contacts for progressively raising the speed of said motor, and coarse directional relays effective upon each response by said coarse directional contacts for continuing said motor in operation at maximum speed and for removing the control thereof from said fine directional and speed change contacts.

2. In a positioning system, the combination of an object to be positioned, an electric motor for imparting positioning movement to said object, means including a control winding for determining the direction and the speed of said motor's rotation, a control indicator mechanically movable to any position that is desired for said object, data receiver means effective at times for automatically positioning said control indicator and hand operated means effective at other times for manually positioning the control indicator, an object indicator which at all times registers said object's actual position, fine directional contacts actuated by said control and object indicators and responding to small positional variances therebetween, coarse directional contacts also actuated by said control and object indicators but responding only to large positional variances therebetween, an energizing source for said motor control winding, master directional relays effective upon each response by said fine directional contacts under both automatic and manual positioning of said control indicator for connecting said control winding with said source in a way which causes said motor to provide low speed movement of said object towards positional coincidence with said control indicator, and means effective upon each response by said coarse directional contacts under and only under automatic positioning of said control indicator for establishing between said control winding and said source a corresponding connection which differs from the first in causing high speed operation by said motor and in removing said fine directional contacts from the control thereof.

3. In combination, an object to be positioned, an electric motor for imparting positioning movement to said object, means including a control winding for determining the direction and the speed of said motor's rotation, a control indicator mechanically movable to any position that is desired for said object, an object indicator which at all times registers said object's actual position, a heart cam rotated by one of said two indicators and receiving in its notch a roller resiliently held thereagainst, a central directional contact member resiliently maintained by said roller in the rotative position of said heart cam's notch, a pair of side directional contact members so carried by the other of said two indicators as selectively to be engaged by said central member upon positional variance between the two indicators in one direction or the other, speed change contacts also actuated by said heart cam but responding when and only when the named positional variance becomes sufficiently large to move said heart cam's notch out of register with said roller and thereby force the roller away from the heart cam's center, a source of energizing current for said control winding, means effective upon each engagement of said central and side directional contact members for connecting said control winding with said source in a way which causes said motor to move said object at slow speed toward positional coincidence with said control indicator, and winding current adjusting means effective upon response by said speed change contacts for raising the speed of said motor's operation.

4. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, and means responsive to the positional variance between said object and said transmitter rotor for impressing upon said tube a grid potential which controls the tube's conductivity and thereby makes said motor's speed dependent upon how much said object positionally lags said transmitter rotor.

5. In combination, an object to be positioned, an electric motor for imparting positioning movement to said object, means including a control winding for determining the direction and the speed of said motor's rotation, a data transmitter having stator windings plus a rotor and a rotor winding, means for mechanically moving said transmitter rotor to any position that is desired for said object, a data receiver also having stator windings plus a rotor and a rotor winding, an alternating current source exciting both of said rotor windings, conductors interconnecting the stator windings of said receiver with those of said transmitter whereby said receiver rotor is caused mechanically to repeat the position of said transmitter rotor, mechanism which at all times registers the actual position of said object, directional contacts actuated jointly by said receiver rotor and said mechanism and engaging in response to positional variance between said transmitter rotor and said object whereby then to restrain further movement of the receiver rotor with respect to said mechanism and thereby set up in said stator interconnecting conductors currents that are proportional to the magnitude of said positional variance, an energizing source for said motor control winding, means operative upon each engagement of said directional contacts for connecting said control winding with said source in a way which causes said motor to rotate and move said object toward positional coincidence with said transmitter rotor, an electronic tube included in said winding energizing connection for adjusting the control winding current and hence the speed of said motor's rotation, and means responsive to the said positional variance currents that flow through said stator interconnecting conductors for impressing upon said tube a grid potential which controls the tube's conductivity and thereby makes said motor's speed dependent upon how much said object positionally lags said transmitter rotor.

6. In combination, an object to be positioned, an electric motor for imparting positioning movement to said object, means including a control winding for determining the direction and the speed of said motor's rotation, a data transmitter having stator windings plus a rotor and a rotor winding, means for mechanically moving said transmitter rotor to any position that is desired for said object, a data receiver also having stator windings plus a rotor and a rotor winding, an alternating current source exciting both of said rotor windings, conductors interconnecting the stator windings of said receiver with those of said transmitter whereby said receiver rotor is caused mechanically to repeat the position of said transmitter rotor, mechanism which at all times registers the actual position of said object, directional contacts actuated jointly by said receiver rotor and said mechanism and engaging in response to positional variance between said transmitter rotor and said object whereby then to restrain further movement of the receiver rotor with respect to the mechanism and thereby set up in said stator interconnecting conductors currents that are proportional to the magnitude of said positional variance, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, means serially included in one of said stator interconnecting conductors for providing an alternating current voltage which is proportional to the said positional variance current in that conductor, rectifier means for converting said voltage into a unidirectional potential, and means for controlling the conductivity of said tube by said potential whereby to make said motor's speed dependent upon how much said object positionally lags said transmitter rotor.

7. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said course in a way which causes said motor to rotate and move said object toward positional coincidence with said transmitter rotor, an electronic tube included in said winding energizing connection for adjusting the winding current and hence the speed of said motor's rotation, means responsive to the positional variance between said objects and said transmitter rotor for impressing upon said tube an "absolute error" grid potential which controls the tube's conductivity and thereby makes said motor's speed dependent upon how much said object positionally lags said transmitter rotor, and means responsive to changes in the magnitude of said positional lag for supplementing said "absolute error" potential by an "error variation" grid voltage which upon approach of said object to positional coincidence with said transmitter rotor so slows the motor speed as to prevent overshooting of the corrective movement.

8. In combination, an object to be positioned, an electric motor for imparting positioning movement to said object, means including a control winding for determining the direction and the speed of said motor's rotation, a data transmitter having stator windings plus a rotor and a rotor winding, means for mechanically moving said transmitter rotor to any position that is desired for said object, a data receiver also having stator windings plus a rotor and a rotor winding, an alternating current source exciting both of said rotor windings, conductors interconnecting the stator windings of said receiver with those of said transmitter whereby said receiver rotor is caused mechanically to repeat the position of said transmitter rotor, mechanism which at all times registers the actual position of said object, directional contacts actuated jointly by said receiver rotor and said mechanism and engaging in response to positional variance between said transmitter rotor and said object whereby then to restrain further movement of the receiver rotor with respect to said mechanism and thereby set up in said stator interconnecting conductors currents that are proportional to the magnitude of said positional variance, an energizing source for said motor control winding, means operative upon each engagement of said directional contacts for connecting said control winding with said source in a way which causes said motor to rotate and move said object toward positional coincidence with said transmitter rotor, an electronic tube included in said winding energizing connection for adjusting the winding current and hence the speed of said motor's rotation, means responsive to the said positional variance currents in said stator interconnecting conductors for impressing upon said tube an "absolute error" grid potential which controls the tube's conductivity and thereby makes said motor's speed dependent upon how much said object positionally lags said transmitter rotor, and means responsive to changes in the magnitude of said positional variance currents for supplementing said "absolute error" potential by an "error variation" grid voltage which upon approach of said object to positional coincidence with said transmitter rotor so slows the motor speed as to prevent overshooting of the corrective movement.

9. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which causes said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, means responsive to the positional variance between said object and said transmitter rotor for impressing upon said tube an "absolute error" grid potential which controls the tube's conductivity and thereby makes said motor's speed dependent upon how much said object positionally lags said transmitter rotor, and a supplemental connection from said source to said control winding also established only during engagement by said directional contacts but effective upon reduction of said tube's conductivity completely to zero then to flow through said winding a small value of current having direction opposite to that supplied to the winding through said tube.

10. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, means responsive to the positional variance between said object and said transmitter rotor for impressing upon said tube an "absolute error" grid potential which controls the tube's conductivity and thereby makes said motor's speed dependent upon how much said object positionally lags said transmitter rotor, and means responsive to the current passed by said tube through said control winding for supplementing said "absolute error" potential by a "load compounding" grid voltage which for each absolute error potential value adjusts said tube's conductivity in substantial conformity with said winding current's magnitude.

11. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, means responsive to the positional variance between said object and said transmitter rotor for impressing upon said tube an "absolute error" grid potential which controls the tube's conductivity and thereby makes said motor's speed dependent upon how much said object positionally lags said transmitter rotor, and means responsive to changes in the voltage of said winding energizing source for supplementing said "absolute error" potential by a "change compensating" grid voltage which prevents said changes in the source voltage from altering said electronic tube's responsiveness to said error potential in controlling said winding current.

12. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, means responsive to the positional variance between said object and said transmitter rotor for impressing upon said tube an "absolute error" grid potential which controls the tube's conductivity and thereby makes said motor's speed dependent upon how much said object positionally lags said transmitter rotor, means responsive to changes in the magnitude of said positional lag for supplementing said "absolute error" potential by an "error variation" grid voltage which upon approach of said object to positional coincidence with said transmitter rotor so slows the motor speed as to prevent overshooting of the corrective movement, and means responsive to the current passed by said tube through said control winding for supplementing said "absolute error" and "error variation" potentials by a "compensating" grid voltage which for each absolute error potential value adjusts said tube's conductivity in substantial conformity with said winding current's magnitude.

13. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, a circuit energized in accordance with the positional variance between said object and said transmitter rotor for impressing upon said tube an "absolute error" grid potential which controls the tube's conductivity and thereby makes said motor's speed dependent upon how much said object positionally lags said transmitter rotor, a capacitor serially included in said grid supply circuit, means responsive to the current passed by said tube through said control winding for causing to appear across said capacitor a "compensating" voltage which supplements said "absolute error" grid potential in determining said tube's conductivity, and a by-passing device for said capacitor which allows capacitor voltage to be introduced into said grid supply circuit when and only when said directional contacts are engaged whereby upon each initiation of positioning motor operation by those contacts no part of said compensating voltage is present in said grid supply circuit.

14. In combination, an object to be positioned, an electric motor for imparting positioning movement to said object, means including a control winding for determining the direction and the speed of said motor's rotation, a data transmitter including a rotor mechanically movable to any position that is desired for said object, a data receiver also including a rotor, electrical interconnecting means between said transmitter and said receiver which cause said receiver rotor mechanically to repeat the position of said transmitter rotor, mechanism which at all times registers the actual position of said object, directional contacts actuated jointly by said receiver rotor and said mechanism and engaging in response to positional variance therebetween, an energizing source for said motor control winding, means operative upon each engagement of said directional contacts for connecting said winding with said source in a way which causes said motor to rotate and move said object toward positional coincidence with said transmitter rotor, an electronic tube included in said winding energizing connection for adjusting the winding current and hence the speed of said motor's rotation, a circuit energized in accordance with the positional variance between said object and said transmitter rotor for impressing upon said tube an "absolute error" grid potential which controls the tube's conductivity and thereby makes said motor's speed dependent upon how much said object positionally lags said transmitter rotor, a capacitor serially included in said grid supply circuit, circuit means responsive to the current passed by said tube through said control winding for impressing upon said capacitor a "compensating" voltage which supplements said "absolute error" grid potential in determining said tube's conductivity, a resistor forming a part of said circuit means and serving to require an appreciable time for said capacitor to attain said compensating voltage's full value, and a by-passing device for said capacitor which allows capacitor voltage to be introduced into said grid supply circuit when and only when said directional contacts are engaged whereby upon each initiation of positioning motor operation by those contacts no part of said compensating voltage is present in said grid supply circuit.

JOSEPH H. BORDEN.